US012590443B2

(12) United States Patent
Hatta et al.

(10) Patent No.: US 12,590,443 B2
(45) Date of Patent: Mar. 31, 2026

(54) WORKING MACHINE

(71) Applicant: KUBOTA CORPORATION, Osaka (JP)

(72) Inventors: Kazuyuki Hatta, Osaka (JP); Hiroshi Horii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/225,113

(22) Filed: Jun. 2, 2025

(65) Prior Publication Data

US 2025/0290296 A1 Sep. 18, 2025

Related U.S. Application Data

(63) Continuation of application No. PCT/JP2024/015350, filed on Apr. 18, 2024.

(30) Foreign Application Priority Data

May 24, 2023 (JP) ................................ 2023-085741

(51) Int. Cl.

| | |
|---|---|
| ***E02F 9/26*** | (2006.01) |
| ***B60Q 1/24*** | (2006.01) |
| ***E02F 3/32*** | (2006.01) |

(52) U.S. Cl.

CPC .............. *E02F 9/261* (2013.01); *B60Q 1/247* (2022.05); *E02F 3/32* (2013.01); *B60Q 2800/20* (2022.05)

(58) Field of Classification Search

CPC ............. E02F 9/261; E02F 3/32; B60Q 1/247

See application file for complete search history.

(56) References Cited

U.S. PATENT DOCUMENTS

2016/0200240 A1* 7/2016 Quinlan ............... H05B 47/195 315/80
2017/0311406 A1 10/2017 Quinlan et al.
(Continued)

FOREIGN PATENT DOCUMENTS

CN 112752380 A 5/2021
JP 1994-71545 U1 10/1994
(Continued)

OTHER PUBLICATIONS

Written Opinion with International Search Report, dated Jun. 11, 2024,issued in International Bureau of WIPO Patent Application No. PCT/JP2024/015350 with English language translation.
(Continued)

*Primary Examiner* — Bryon T Gyllstrom
(74) *Attorney, Agent, or Firm* — GREENBLUM & BERNSTEIN, P.L.C.

(57) ABSTRACT

A working machine includes a machine body, a boom including a proximal end swingably coupled to the machine body, an arm coupled to a distal end of the boom swingably in arm-crowd and arm-dump directions, a working lamp on the boom, and an illumination controller to control the working lamp. The working lamp includes first and second light sources. The optical axis of the first light source is oriented more to the distal end of the boom than that of the second light source is, and the optical axis of the second light source is oriented more to the proximal end of the boom than that of the first light source is. The illumination controller is configured or programmed to, when the arm is within a crowd range, control illuminance of the first light source such that the illuminance is lower than when the arm is within a dump range.

18 Claims, 17 Drawing Sheets

(56) References Cited

U.S. PATENT DOCUMENTS

| | | | | |
|---|---|---|---|---|
| 2020/0131731 | A1* | 4/2020 | Wu | E02F 3/439 |
| 2023/0060815 | A1* | 3/2023 | Massey | G05D 1/2247 |
| 2023/0417023 | A1* | 12/2023 | Itoh | E02F 9/20 |
| 2025/0137235 | A1* | 5/2025 | Matsuhashi | E02F 9/205 |
| 2025/0171981 | A1* | 5/2025 | Yu | G06T 19/00 |
| 2025/0215663 | A1* | 7/2025 | Matsuhashi | E02F 3/32 |
| 2025/0283305 | A1* | 9/2025 | Yamamoto | E02F 9/24 |
| 2025/0283306 | A1* | 9/2025 | Matsuhashi | E02F 9/261 |

FOREIGN PATENT DOCUMENTS

| | | | |
|---|---|---|---|
| JP | 2002-129593 | A | 5/2002 |
| JP | 2002-339401 | A | 11/2002 |
| JP | 2009-146828 | A | 7/2009 |
| JP | 2018-502778 | A | 2/2018 |
| JP | 2019-142447 | A | 8/2019 |
| JP | 20221-40703 | A | 9/2022 |
| KR | 10-2022-0050510 | A | 4/2022 |

OTHER PUBLICATIONS

Office Action, dated Jan. 13, 2026, issued in Japan family member Appl. No. 2025-521874 with an English language translation thereof.

* cited by examiner

| | Arm angle D2 | | |
|---|---|---|---|
| | Dump range P3  | Intermediate range P5  | Crowd range P2  |
| First working lamp E1 | High illuminance level (100%) | High illuminance level (100%) | Low illuminance level (0%) |
| Second working lamp E2 | Low illuminance level (0%) | High illuminance level (100%) | High illuminance level (100%) |

| | Arm angle D2 | | |
|---|---|---|---|
| | Dump range P3  | Intermediate range P5  | Crowd range P2  |
| First working lamp E1 | High illuminance level (100%) | (99% ⇆ 1%) | Low illuminance level (0%) |
| Second working lamp E2 | Low illuminance level (0%) | (1% ⇄ 99%) | High illuminance level (100%) |

| | Arm angle D2 | |
|---|---|---|
| | Dump range P3 ← intermediate position S5  | Intermediate position S5 → crowd range P2  |
| First working lamp E1 | High illuminance level (100%) | Low illuminance level (0%) |
| Second working lamp E2 | Low illuminance level (0%) | High illuminance level (100%) |

| | Boom angle D1 | |
|---|---|---|
| | Raising range P4 ← set position S4  | Set position S4 → lowering range P1  |
| First working lamp E1 | Low illuminance level (0%) | High illuminance level (100%) |
| Second working lamp E2 | High illuminance level (100%) | Low illuminance level (0%) |

| | Arm angle D2 | | |
|---|---|---|---|
| | Dump range P3  | Intermediate range P5  | Crowd range P2  |
| First working lamp E1 | High illuminance level (100%) | Medium illuminance level (50%) | Low illuminance level (0%) |
| Third working lamp E3 | Low illuminance level (0%) | High illuminance level (100%) | Low illuminance level (0%) |
| Second working lamp E2 | Low illuminance level (0%) | Medium illuminance level (50%) | High illuminance level (100%) |

| | Arm angle D2 | | |
|---|---|---|---|
| | Dump range P3  | Intermediate range P5  | Crowd range P2  |
| First working lamp E1 | High illuminance level (100%) | (99% ⇆ 1%) | Low illuminance level (0%) |
| Third working lamp E3 | (0% ⇄ 99%) | High illuminance level (100%) | (99% ⇆ 0%) |
| Second working lamp E2 | Low illuminance level (0%) | (1% ⇄ 99%) | High illuminance level (100%) |

WORKING MACHINE

CROSS REFERENCE TO RELATED APPLICATIONS

This application is a continuation application of International Application No. PCT/JP2024/015350, filed on Apr. 18, 2024, which claims the benefit of priority to Japanese Patent Application No. 2023-085741, filed on May 24, 2023. The entire contents of each of these applications are hereby incorporated herein by reference.

BACKGROUND OF THE INVENTION

1. Field of the Invention

The present invention relates to working machines such as backhoes.

2. Description of the Related Art

The working machine disclosed in Japanese Unexamined Patent Application Publication No. 2019-142447 includes a working lamp provided at a boom so as to illuminate the surrounding area of a working device.

SUMMARY OF THE INVENTION

However, when trying to illuminate a wide area around the working device using a single working lamp provided at a boom as in the above-mentioned working machine of the related art, the illumination may extend to areas where illumination is unnecessary depending on the angle of the boom, resulting in unnecessary power consumption. Furthermore, when the boom is raised high, areas outside a working area, such as nearby residences and automobiles, may be unnecessarily illuminated.

Example embodiments of the present invention provide working machines each capable of achieving a reduction in power consumption during work and appropriately illuminating a work area.

A working machine according to an example embodiment of the present invention includes a machine body, a boom including a proximal end coupled to the machine body such that the boom is swingable up and down, an arm coupled to a distal end of the boom such that the arm is swingable in an arm-crowd direction which is a direction toward the boom and an arm-dump direction which is a direction away from the boom, a working tool attached to a distal end of the arm, a working lamp provided at the boom to illuminate a work area around the boom, and an illumination controller configured or programmed to control an illumination operation of the working lamp, wherein the working lamp includes a first light source and a second light source with different optical axis directions from each other, the optical axis direction of the first light source is oriented more to the distal end of the boom than the optical axis direction of the second light source is to the distal end of the boom, and the optical axis direction of the second light source is oriented more to the proximal end of the boom than the optical axis direction of the first light source is to the proximal end of the boom, and the illumination controller is configured or programmed to, when the arm is within a crowd range, perform a first control to control an illuminance of the first light source such that the illuminance of the first light source is lower than when the arm is within a dump range, the crowd range being a portion of a swinging range of the arm that is located in the arm-crowd direction, the dump range being another portion of the swinging range that is located downstream of the crowd range in the arm-dump direction.

The illumination controller may be configured or programmed to, when the arm is within the dump range, perform a second control to control an illuminance of the second light source such that the illuminance of the second light source is lower than when the arm is within the crowd range.

The illumination controller may be configured or programmed to, when the arm is within an intermediate range between the crowd range and the dump range, perform a third control to control the illuminance of the first light source such that the illuminance of the first light source is higher than when the arm is within the crowd range, and control the illuminance of the second light source such that the illuminance of the second light source is higher than when the arm is within the dump range.

The illumination controller may be configured or programmed to perform, in the third control, when the arm is within the intermediate range, control the illuminance of the first light source such that the illuminance of the first light source continuously decreases as the arm swings in a direction from the dump range toward the crowd range, and control the illuminance of the first light source such that the illuminance of the first light source continuously increases as the arm swings in a direction from the crowd range toward the dump range.

The illumination controller may be configured or programmed to perform, the third control, when the arm is within the intermediate range, control the illuminance of the second light source such that the illuminance of the second light source continuously increases as the arm swings in a direction from the dump range toward the crowd range, and control the illuminance of the second light source such that the illuminance of the second light source continuously decreases as the arm swings in a direction from the crowd range toward the dump range.

The illumination controller may be configured or programmed to, when the boom has been swung to a position higher than a predetermined set position, regardless of an operating status of the arm, perform a fourth control to control the illuminance of the first light source such that the illuminance of the first light source is lower than when the boom is positioned lower than the set position.

A working machine according to an example embodiment of the present invention includes a machine body, a boom including a proximal end coupled to the machine body such that the boom is swingable up and down, an arm coupled to a distal end of the boom such that the arm is swingable in an arm-crowd direction which is a direction toward the boom and an arm-dump direction which is a direction away from the boom, a working tool attached to a distal end of the arm, a working lamp provided at the boom to illuminate a work area around the boom, and an illumination controller configured or programmed to control an illumination operation of the working lamp, wherein the working lamp includes a first light source and a second light source with different optical axis directions from each other, the optical axis direction of the first light source is oriented more to the distal end of the boom than the optical axis direction of the second light source is to the distal end of the boom, and the optical axis direction of the second light source is oriented more to the proximal end of the boom than the optical axis direction of the first light source is to the proximal end of the boom, and the illumination controller is configured or programmed to, when the boom has been swung to a position higher than a predetermined set position, regardless of an operating status of the arm, perform a fourth control to control an illuminance of the first light source such that the illuminance of the first light source is lower than when the boom is positioned lower than the set position.

The working machine may further include a first switch to be operated to enable and disable the fourth control performed by the illumination controller.

The illumination controller may be configured or programmed to, when the boom has been swung to a position higher than a predetermined set position, regardless of an operating status of the arm, control an illuminance of the second light source such that the illuminance of the second light source is higher than when the boom is positioned lower than the set position.

The working machine may further include a second switch to be operated to enable and disable the first to third controls performed by the illumination controller.

The second light source may be operable to illuminate a surrounding area of the working tool when the arm is within a crowd range, the crowd range being a portion of a swinging range of the arm that is located in the arm-crowd direction. The first light source may be operable to illuminate the surrounding area of the working tool when the arm is within a dump range, the dump range being another portion of the swinging range that is located downstream of the crowd range in the arm-dump direction.

The working machine may further include a boom cylinder connected between the machine body and the boom to cause the boom to swing. The boom may be provided with a cylinder bracket to support an end portion of the boom cylinder such that the boom cylinder is rotatable. The working lamp may be provided in a gap inside the cylinder bracket.

The working lamp may include a third light source with an optical axis direction oriented more to the distal end of the boom than the optical axis direction of the second light source is to the distal end of the boom and oriented more to the proximal end of the boom than the optical axis direction of the first light source is to the proximal end of the boom. The illumination controller may be configured or programmed to, when the arm is within an intermediate range between a crowd range and a dump range, perform a fifth control to control an illuminance of the third light source such that the illuminance of the third light source is higher than at least one of the illuminance of the third light source when the arm is within the crowd range or the illuminance of the third light source when the arm is within the dump range, the crowd range being a portion of a swinging range of the arm that is located in the arm-crowd direction, the dump range being another portion of the swinging range that is located downstream of the crowd range in the arm-dump direction.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
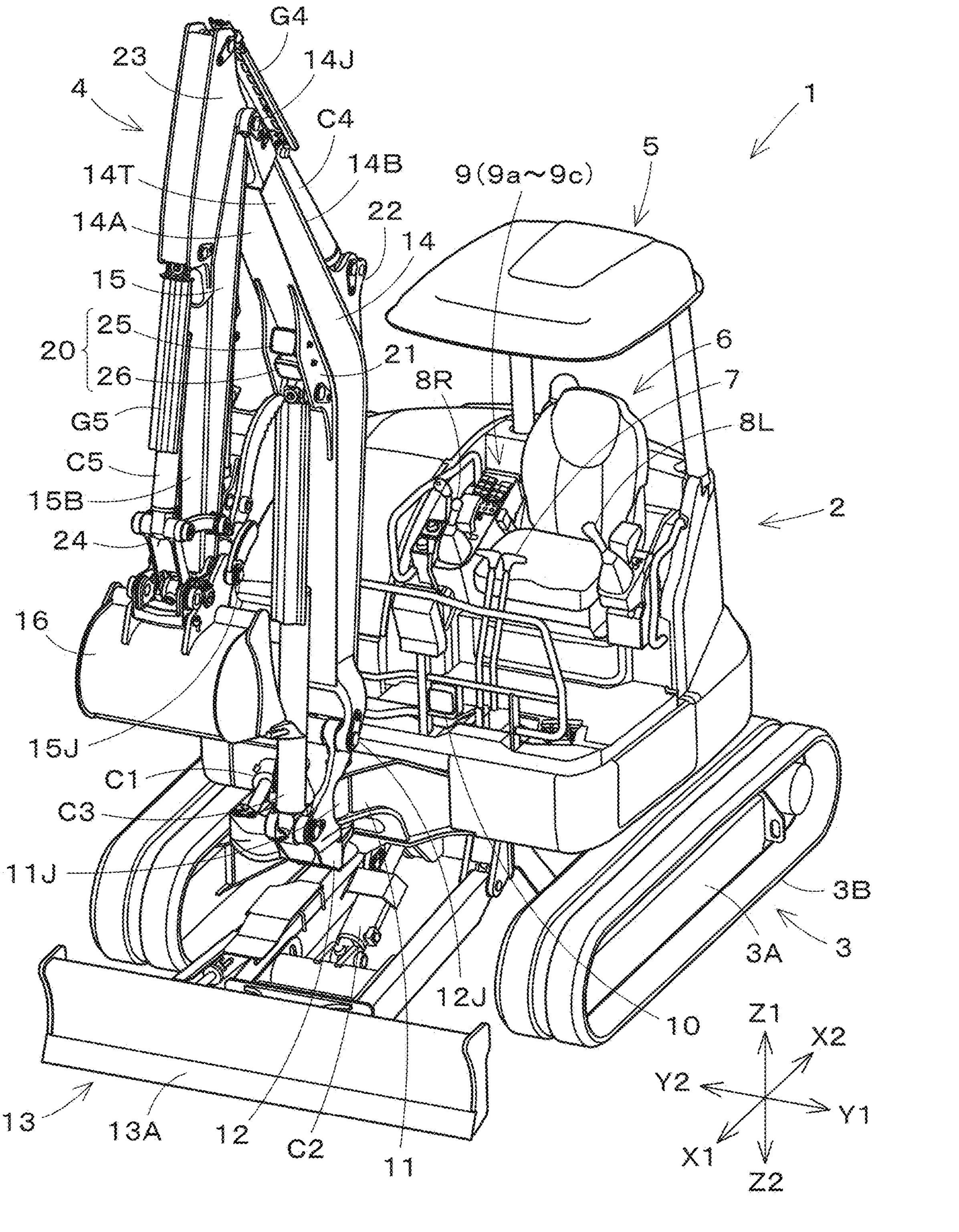
FIG. 1 is a front perspective view of a working machine.

Example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the present invention will be described below with reference to the drawings.

Figure 2:
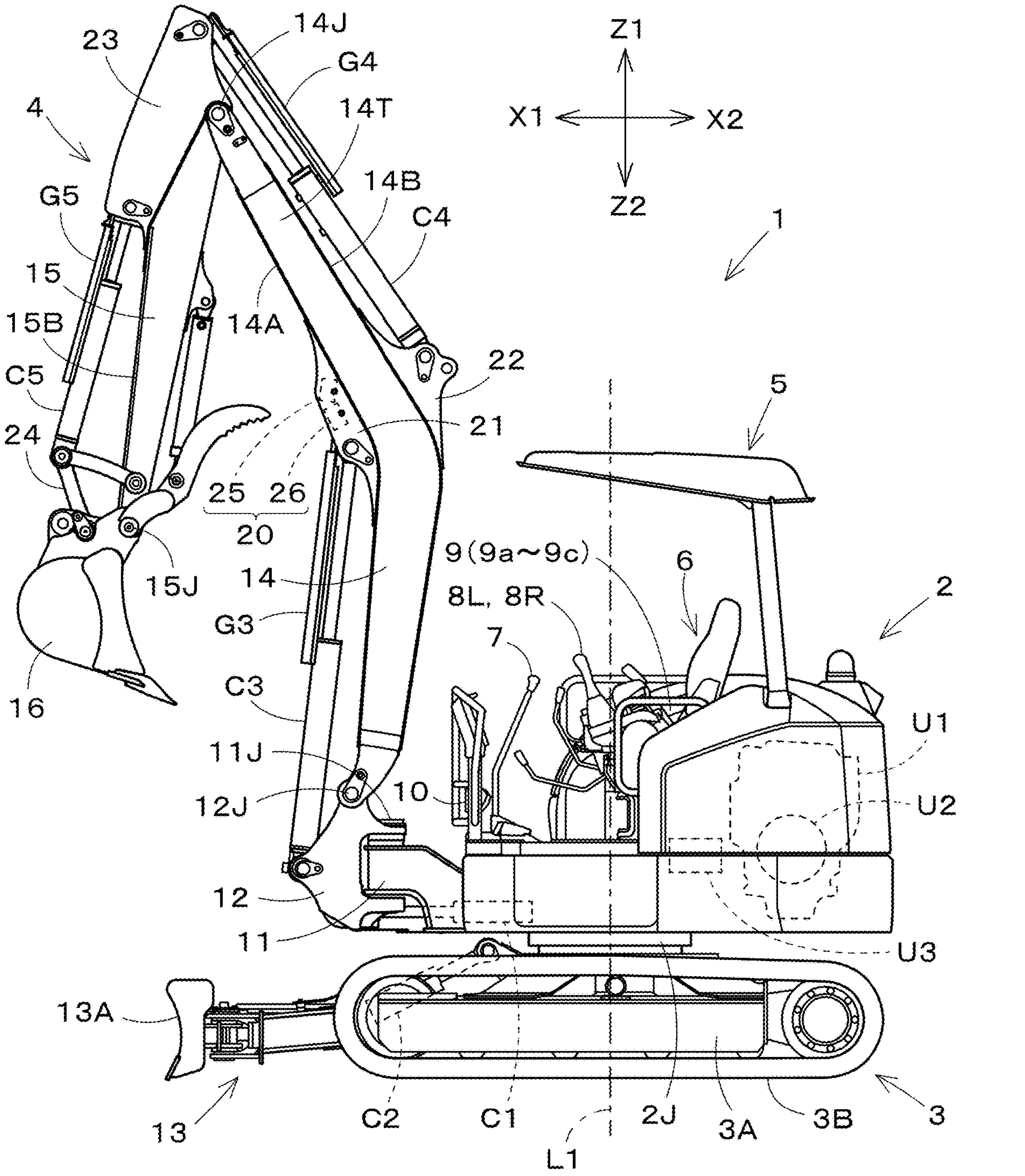
FIG. 2 is a left side view of the working machine.

As illustrated in FIG. 1 and FIG. 2, a working machine 1 of the present example embodiment is a backhoe that includes a machine body (a slewing base) 2, a traveling device 3, and a working device 4. A canopy 5 is mounted on the machine body 2. An operator's seat 6 where an operator (a driver) sits is provided inside the canopy 5. The canopy 5 is a protection mechanism that protects the operator's seat 6. Note that the working machine 1 is not limited to a backhoe and may be another type of working machine. Furthermore, instead of the canopy 5, a cabin that surrounds the operator's seat 6 may be mounted on the machine body 2, as the protection mechanism that protects the operator's seat 6.

In the present example embodiment, a direction in which the operator in the operator's seat 6 faces (the direction indicated by arrow X1 in FIG. 1 and FIG. 2) is the front of the machine body 2, and the opposite direction (the direction indicated by arrow X2 in FIG. 1 and FIG. 2) is the rear of the machine body 2. The left side of the operator (the direction indicated by arrow Y1 in FIG. 1) will be referred to as the left of the machine body 2, and the opposite direction (the direction indicated by arrow Y2 in FIG. 1) will be referred to as the right of the machine body 2. Furthermore, the upper side of the operator (the direction indicated by arrow Z1 in FIG. 1 and FIG. 2) will be referred to as the upper side of the machine body 2, and the opposite direction (the direction indicated by arrow Z2 in FIG. 1 and FIG. 2) will be referred to as the lower side of the machine body 2.

Machine Body

As illustrated in FIG. 2, the machine body 2 is supported on an upper portion of the traveling device 3 via a slewing bearing 2J. In other words, the machine body 2 is rotatably supported relative to the traveling device 3 about a slewing axis (an axis extending in the vertical direction) L1. The slewing axis L1 is the center of rotation of the slewing bearing 2J.

A prime mover U1, a hydraulic pump U2, a controller U3, and so forth are installed inside the machine body 2. The prime mover U1 is a diesel engine. Note that the prime mover U1 may be a gasoline engine or an electric motor or may be a hybrid prime mover that includes an engine and an electric motor. The hydraulic pump U2 is coupled to the prime mover U1. The hydraulic pump U2 is driven by the power of the prime mover U1 and supplies a hydraulic fluid (a pressure oil) to a hydraulic motor and hydraulic actuators, such as hydraulic cylinders C1 to C5 (described later), both of which are installed in the working machine 1. The controller U3 controls the operations of the prime mover U1, the hydraulic pump U2, and so forth.

The operator's seat 6, a traveling lever 7, and manipulators 8L and 8R are mounted on the machine body 2 such that they are positioned in front of the prime mover U1. The traveling lever 7 is operated to control the traveling device 3. The manipulators 8L and 8R are operated to control the working device 4 (swinging operations of a boom 14, an arm 15, and a bucket 16, which will be described later), turning of the machine body 2, and the like.

As illustrated in FIG. 1, the manipulators 8L and 8R are arranged one each at the left and right of the operator's seat 6. A manipulator base 9 that supports the manipulator 8R on the right side is provided on the right side of the operator's seat 6. In addition to the manipulator 8R, a plurality of operation switches to be operated to control various functions of the working machine 1 are arranged at the manipulator base 9.

The manipulator base 9 includes an illumination operation member 9*a* for manually switching a working lamp 20 (described later) on and off, a first switch 9*b* for manually switching enabling and disabling of fourth control of the working lamp 20, and a second switch 9*c* for manually switching enabling and disabling of first to third controls of the working lamp 20. The first to fourth controls of the working lamp 20 will be described later.

A headlight 10 is mounted on the machine body 2 so as to be positioned in front of the operator's seat 6. The headlight 10 is an illumination light that illuminates the front of the machine body 2. In the working machine 1 of the present example embodiment, as illustrated in FIG. 1 and FIG. 2, the headlight 10 is provided at a front lower portion of the operator's seat 6 (in front of the operator's feet).

A support bracket 11 and a swing bracket 12 are arranged at a front portion of the machine body 2. The support bracket 11 is provided so as to project forward from the front portion of the machine body 2. The swing bracket 12 is a member that supports the working device 4 and is provided at a distal end portion of the support bracket 11 so as to be swingable in a transverse direction. More specifically, the swing bracket 12 is rotatably supported about a swing shaft 11J that is provided at the distal end portion of the support bracket 11 so as to extend in the vertical direction. The swing bracket 12 can be swung in the left-right direction by extension or retraction of a swing cylinder (hydraulic cylinder) C1 connecting the machine body 2 and the swing bracket 12 to each other.

Traveling Device

The traveling device 3 is a crawler-type traveling device that supports the machine body 2 such that the machine body 2 can travel, and the traveling device 3 includes a traveling frame 3A and traveling mechanisms 3B. The traveling mechanisms 3B are attached to the traveling frame (track frame) 3A. The traveling frame 3A is a structure that supports the machine body 2 from below. The traveling mechanisms 3B are, for example, crawlers. A dozer 13 is attached to a front portion of the traveling device 3. The dozer 13 can raise and lower a blade (a dozer blade) 13A by extending and retracting a dozer cylinder (one of the hydraulic cylinders) C2. Note that the traveling device 3 is not limited to a crawler type and may be a wheel type.

Working Device

Figure 3:
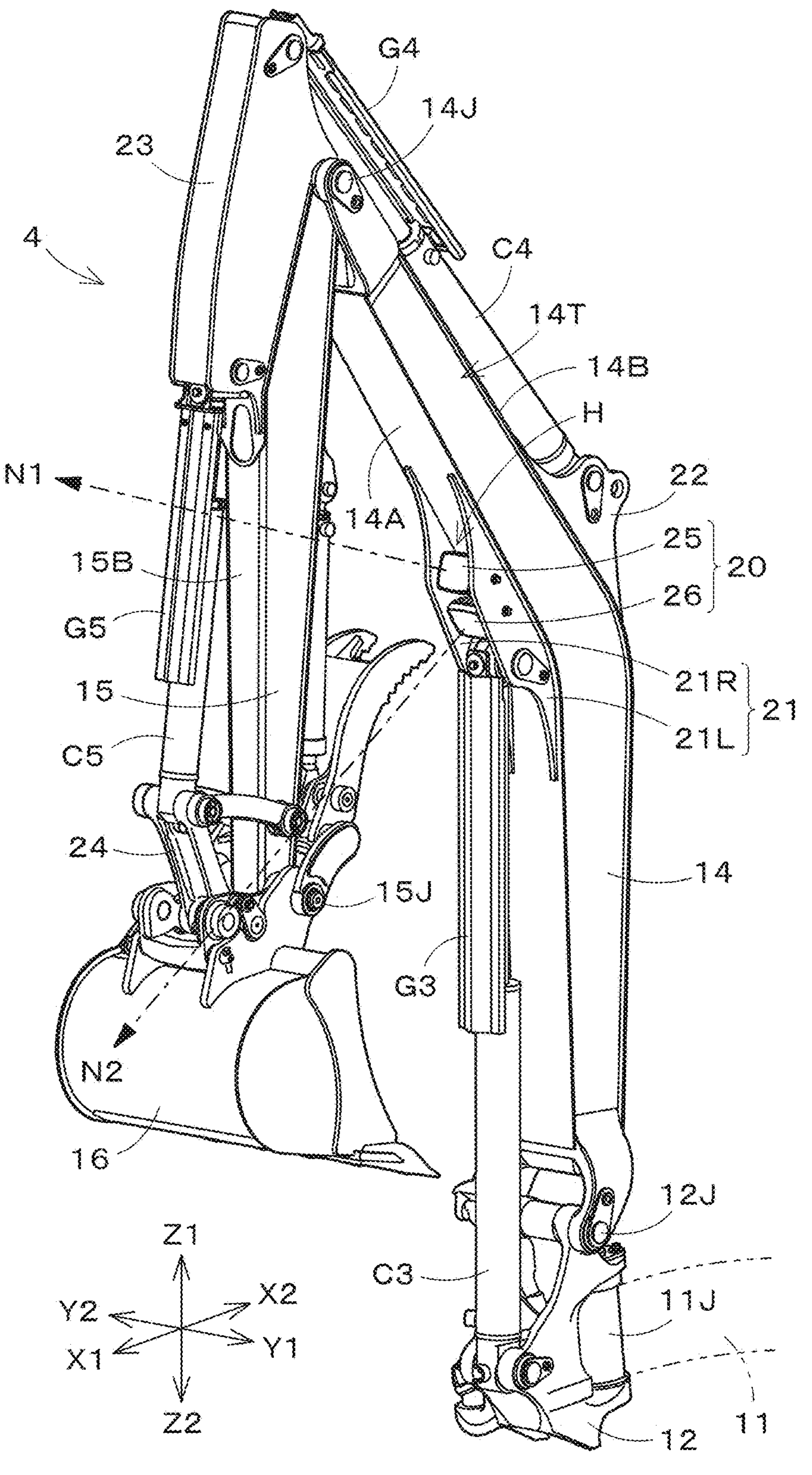
FIG. 3 is a front perspective view of a working device.

As illustrated in FIG. 1 to FIG. 3, the working device 4 includes the boom 14, the arm 15, and the bucket (a working tool) 16. The working device 4 further incudes the working lamp 20. Note that, instead of the bucket 16 or in addition to the bucket 16, another working tool (another hydraulic attachment) that can be driven by hydraulic fluid can be attached to the working machine 1. Examples of the other working tool include a hydraulic breaker, a hydraulic crusher, an angle broom, an earth auger, a pallet fork, a sweeper, a mower, a snow blower, and the like.

The boom 14 is pivotally and swingably supported about a boom support shaft 12J that is provided at an upper end portion of the swing bracket 12 so as to extend in the transverse direction. In other words, the boom 14 is pivotally coupled to the upper end portion of the swing bracket 12 so as to be swingable upward (in the direction of arrow R4 in FIG. 4) and downward (in the direction of arrow R1 in FIG. 4). Note that an operation of raising the boom 14 is an operation of positioning the boom 14 vertically above the support bracket 11. An operation of lowering the boom 14 is an operation of tilting the boom 14 forward relative to the support bracket 11.

The boom 14 is an elongated member having a substantially rectangular prism shape and is formed with a bend such that the boom 14 is substantially inverted V-shaped as viewed from the side when it is swung downward and lowered to the front of the support bracket 11. The boom 14 includes a boom lower surface portion 14A that is located on the lower surface side thereof when the boom 14 is in a lowered state as described above. The boom lower surface portion 14A is provided with a first cylinder bracket 21 at a substantially central portion (a bent portion) between the front and rear thereof. The first cylinder bracket 21 functions as a portion to which a boom cylinder (one of the hydraulic cylinders) C3 is coupled. The boom 14 includes a boom upper surface portion 14B that is located on the upper surface side thereof when the boom 14 is in a lowered state as described above. The boom upper surface portion 14B is provided with a second cylinder bracket 22 at a substantially central portion (bent portion) between the front and rear thereof. The second cylinder bracket 22 functions as a portion to which an arm cylinder (one of the hydraulic cylinders) C4 is coupled.

The boom cylinder C3 is connected between the first cylinder bracket 21 and the swing bracket 12. The boom cylinder C3 is provided with a cylinder cover G3 that protects a cylinder rod of the boom cylinder C3. The boom 14 is swung downward by retracting the boom cylinder C3 and swung upward by extending the boom cylinder C3. In the present example embodiment, the boom 14 is configured to stop swinging at a position (see FIG. 2) where the boom 14 does not interfere with either the canopy 5 or the machine body 2 when the boom 14 is swung upward.

Figure 5:
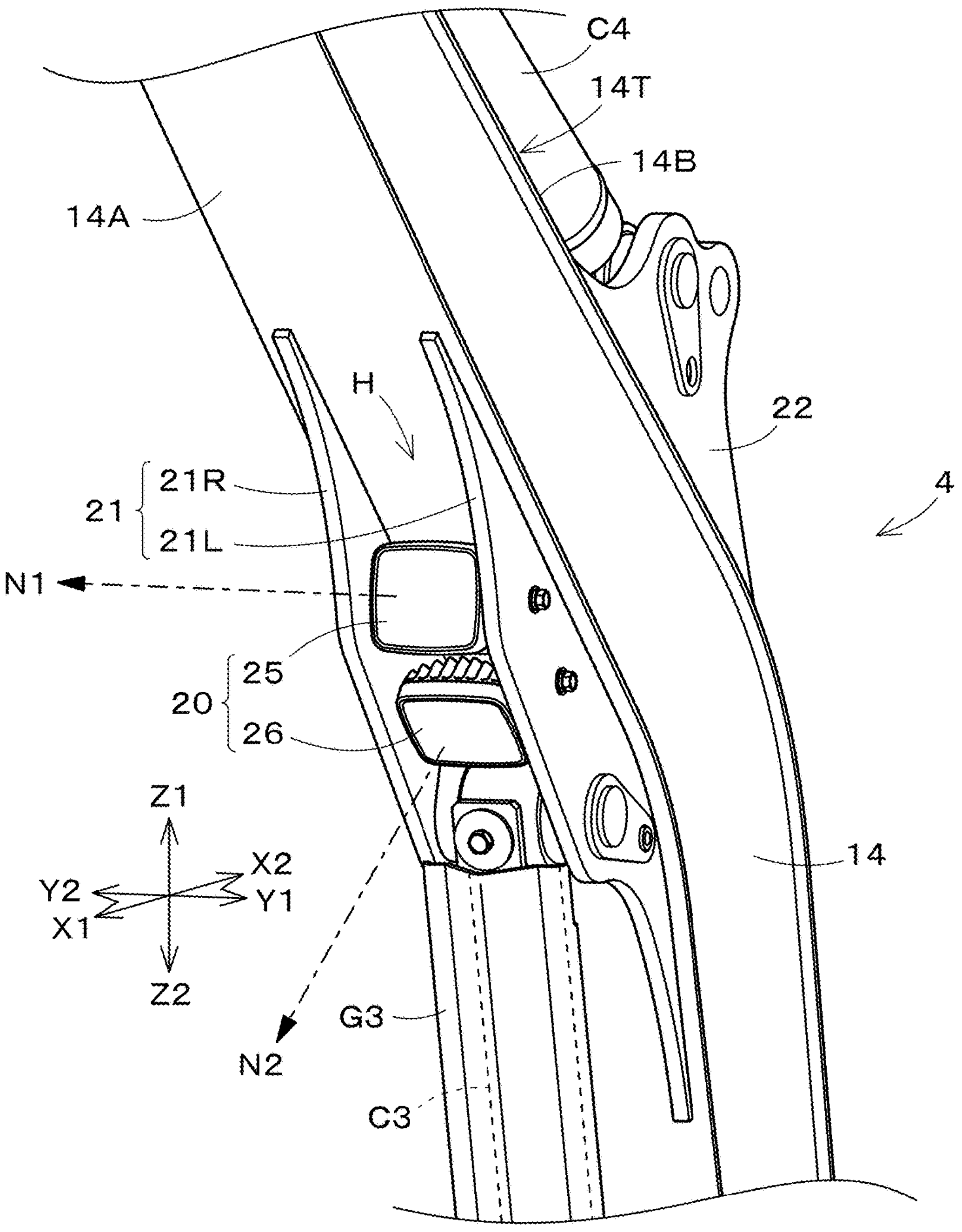
FIG. 5 is a left side view of the peripheral portion of a cylinder bracket.

As illustrated in FIG. 3 and FIG. 5, the first cylinder bracket 21 includes a pair of support side plates 21L and 21R arranged with a predetermined gap formed therebetween in the transverse direction. The working lamp 20 is provided in a gap H that is defined between these support side plates 21L and 21R. The configuration of the working lamp 20 will be described later.

As illustrated in FIG. 1 to FIG. 3, the arm 15 is pivotally and swingably supported about an arm support shaft 14J that is provided at a distal end portion of the boom 14 so as to extend in the transverse direction. In other words, the arm 15 is pivotally coupled to the distal end portion of the boom 14 so as to be swingable in an arm-dump direction (the direction of arrow R3 in FIG. 6) and an arm-crowd direction (the direction of arrow R2 in FIG. 6). Note that an operation of the arm 15 in the arm-crowd direction is an operation (a crowding operation) of bringing the bucket 16 close to the machine body 2. An operation of the arm 15 in the arm-dump direction is an operation (a dumping operation) of moving the bucket 16 away from the machine body 2.

The arm 15 is an elongated member having a substantially rectangular prism shape. The arm 15 includes an arm front surface portion 15B that is located on the front surface side thereof when the arm 15 is swung in the arm-crowd direction and the boom 14 is swung upward (see FIG. 2). The arm front surface portion 15B is provided with a third cylinder bracket 23 at an upper end portion thereof (a proximal end portion). The third cylinder bracket 23 functions as a portion to which the arm cylinder C4 and the working-tool cylinder C5 are coupled.

The arm cylinder C4 is connected between the third cylinder bracket 23 and the second cylinder bracket 22 of the boom 14. The arm cylinder C4 is provided with a cylinder cover G4 that protects a cylinder rod of the arm cylinder C4. The arm 15 is swung in the arm-dump direction (the dumping operation) by retracting the arm cylinder C4 and swung in the arm-crowd direction (the crowding operation) by extending the boom cylinder C3. In the present example embodiment, the arm 15 is configured to stop swinging at a position (see FIG. 2) where the bucket 16 does not interfere with either the boom cylinder C3 or the cylinder cover G3 when the arm 15 is swung in the arm-crowd direction.

The bucket 16 is pivotally and swingably supported about a working-tool support shaft 15J that is provided at a distal end portion of the arm 15 so as to extend in the transverse direction. In other words, the bucket 16 is pivotally coupled to the distal end portion of the arm 15 so as to be swingable in a working-tool dump direction and a working-tool crowd direction. Note that an operation of the bucket 16 in the working-tool crowd direction is a swinging operation (a crowding operation) in a direction in which the distal end portion moves closer to the machine body 2, and this operation is performed, for example, when shoveling soil, sand, or the like with the bucket 16. An operation of the bucket 16 in the working-tool dump direction is a swinging operation (a dumping operation) in a direction in which the distal end portion moves away from the machine body 2, and this operation is performed, for example, when dropping (discharging) shoveled soil, sand, or the like from the bucket 16.

A link mechanism 24 is provided at a proximal end portion of the bucket 16 so as to connect the bucket 16 and the distal end portion of the arm 15 to each other and so as to function as a portion to which the working-tool cylinder C5 is coupled. The working-tool cylinder C5 is connected between the link mechanism 24 and the third cylinder bracket 23 of the arm 15. The working-tool cylinder C5 is provided with a cylinder cover G5 that protects a cylinder rod of the working-tool cylinder C5. The bucket 16 is swung in the working-tool dump direction by retracting the working-tool cylinder C5 and swung in the working-tool crowd direction by extending the working-tool cylinder C5. In the present example embodiment, the bucket 16 is configured to stop swinging at a position where the bucket 16 does not interfere with the arm 15 when the bucket 16 is swung in the working-tool crowd direction.

Working Lamp

As illustrated in FIG. 1 and FIG. 2, the working machine 1 includes the working lamp 20. The working lamp 20 is provided at the boom 14 and illuminates a work area around the boom 14. As illustrated in FIG. 3 and FIG. 5, the working lamp 20 is provided in the gap H inside the first cylinder bracket 21 on the boom 14. The working lamp 20 of the present example embodiment includes two light sources (a first light source 25 and a second light source 26) with different optical axis directions from each other. The working lamp 20 includes the first working lamp (first light source) 25 and the second working lamp (second light source) 26. The first working lamp 25 projects light in a distal end direction of the boom 14 (toward the side on which the arm 15 is present) when the boom 14 is swung downward to be located at a predetermined set position S4 (F) (see FIG. 4). The second working lamp 26 projects light in a downward direction from the boom 14 when the boom 14 is located at the above-mentioned set position S4 (F). Although the configuration of the working lamp 20 (the first working lamp 25 and the second working lamp 26) is not particularly limited, LEDs are employed in the present example embodiment.

The first working lamp 25 is attached to the first cylinder bracket 21 in a position in which a light emitting surface (the optical axis direction) thereof is oriented obliquely downward (in the direction of arrow N1 in FIG. 3 and FIG. 5) with respect to the front in a direction in which a distal-end extension 14T of the boom 14 extends. The second working lamp 26 is attached to the first cylinder bracket 21 at a position rearward of the first working lamp 25 (on the same side of the first working lamp 25 as the proximal end of the boom) and is in a position in which a light emitting surface (the optical axis direction) thereof is oriented (in the direction of arrow N2 in FIG. 3 and FIG. 5) more to the proximal end of the boom 14 than that of the first working lamp 25 is. In other words, the optical axis direction N1 of the first working lamp 25 is oriented more to the distal end of the boom 14 than the optical axis direction N2 of the second working lamp 26 is to the distal end of the boom 14, and the optical axis direction N2 of the second working lamp 26 is oriented more to the proximal end of the boom 14 than the optical axis direction N1 of the first working lamp 25 is to the proximal end of the boom 14. Thus, the working lamp 20 illuminates a position far from the machine body 2 by the first working lamp 25 and illuminates a position close to the machine body 2 by the second working lamp 26. In the present example embodiment, when the arm 15 is within a dump range P3, which will be described later, the first working lamp 25 illuminates the surrounding area of the bucket 16. When the arm 15 is within a crowd range P2, which will be described later, the second working lamp 26 illuminates the surrounding area of the bucket 16 (see FIG. 6).

Both the first working lamp 25 and the second working lamp 26 are fixed to the first cylinder bracket 21, which is provided at the boom lower surface portion 14A. In other words, the first working lamp 25 and the second working lamp 26 are arranged one behind the other at the central portion (the bent portion) of the boom lower surface portion 14A. Upon being turned on, the first working lamp 25 and the second working lamp 26 can illuminate a work area in front of the boom 14 (on the side on which the arm 15 is present) and a work area below the boom 14. Furthermore, when the boom 14 is moved up and down, illumination ranges of the first and second working lamps 25 and 26 are also changed forward and backward accordingly.

Figure 4:
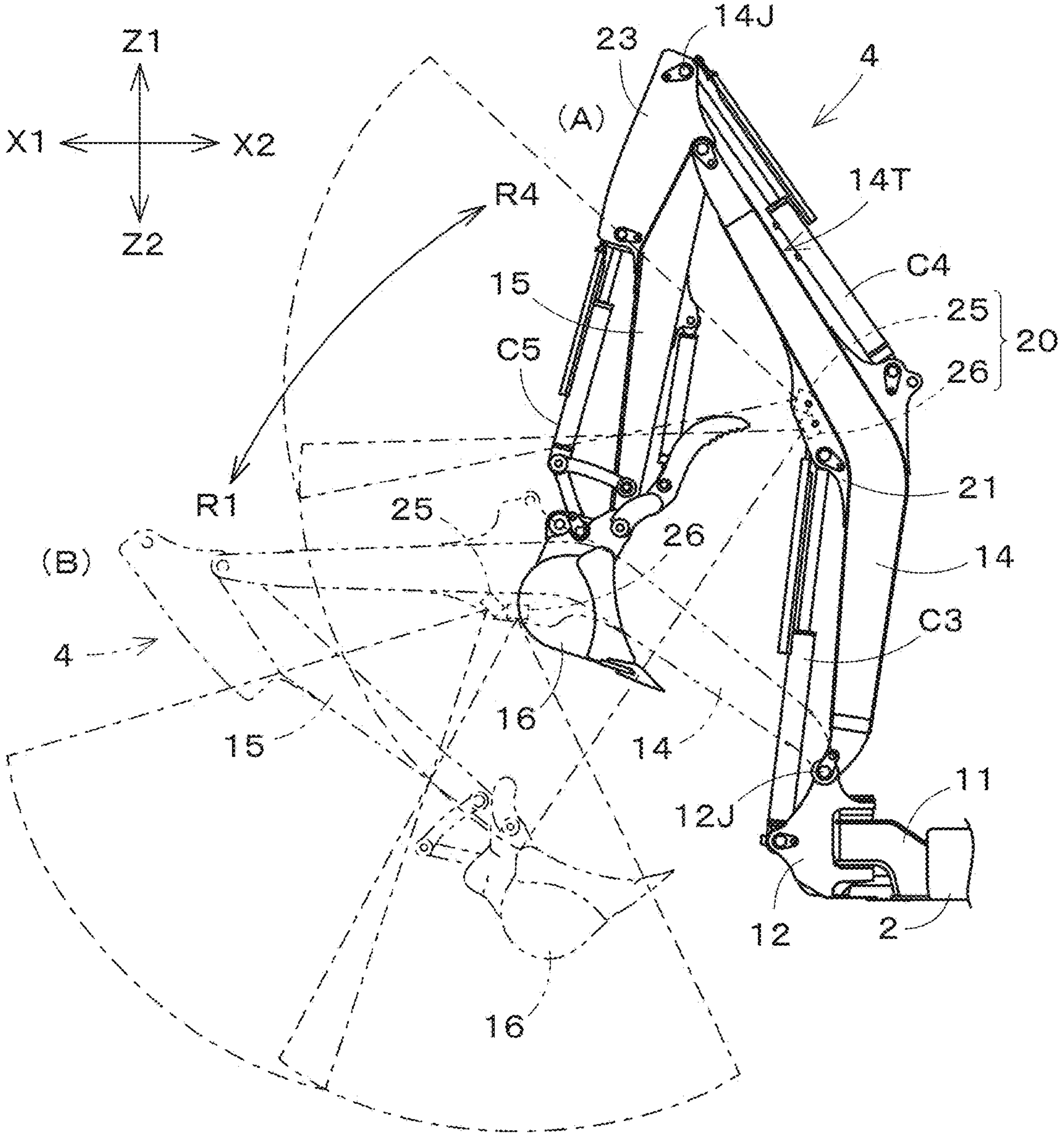
FIG. 4 is a left side view of the working device and illustrates the operating status of a boom.
Figure 6:
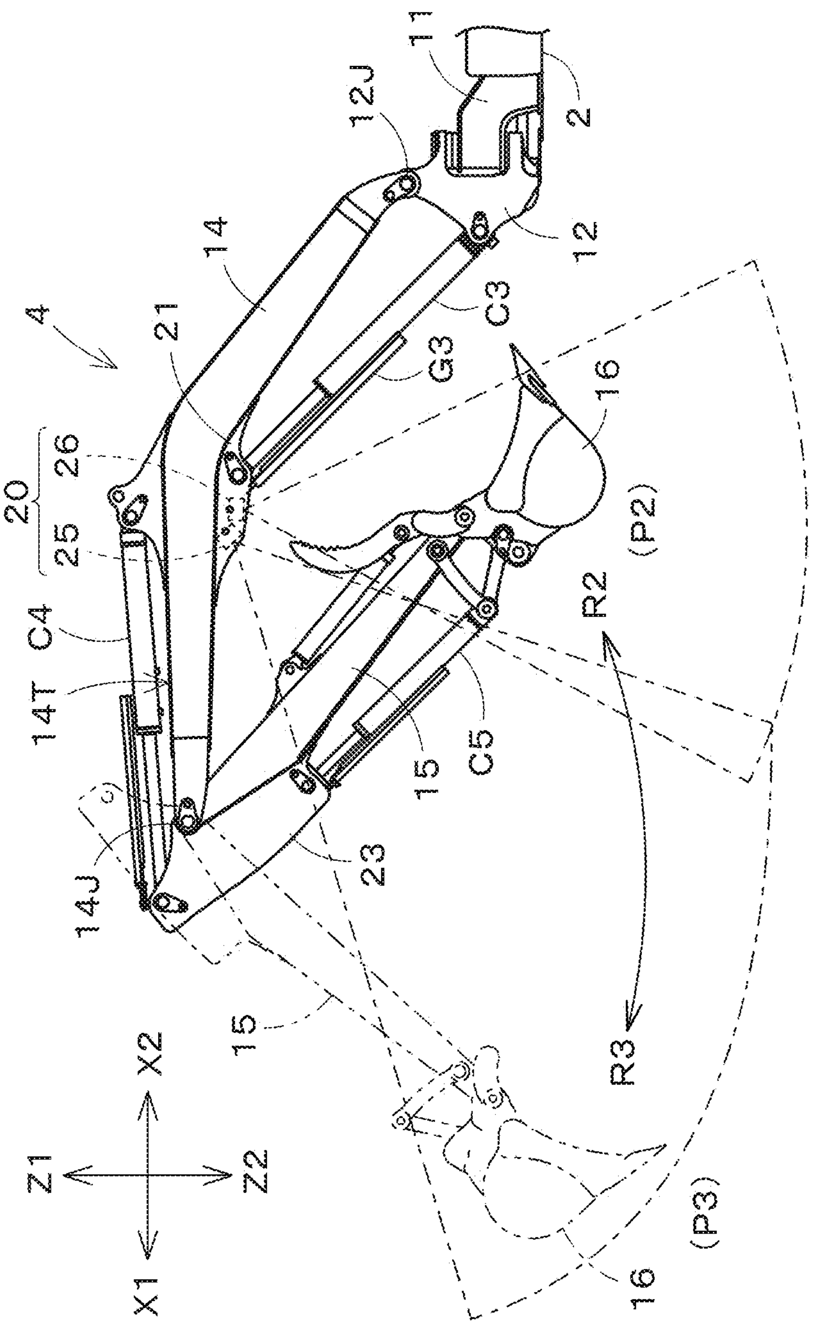
FIG. 6 is a left side view of the working device and illustrates the operating status of an arm.

As illustrated in FIG. 4 and FIG. 6, illumination directions of the first and second working lamps 25 and 26 are set such that the illumination range of the first working lamp 25 and the illumination range of the second working lamp 26 partially overlap each other in the front-rear direction. Thus, when both the first working lamp 25 and the second working lamp 26 are turned on, continuous illumination is provided in the front-rear direction from the illumination range of the first working lamp 25 to the illumination range of the second working lamp 26. Note that the maximum outputs and illumination angles (beam angles) of the first and second working lamps 25 and 26 may be set to be the same as each other or may be set to be different from each other. In the present example embodiment, the first working lamp 25 and the second working lamp 26 are configured such that the outputs thereof can be continuously varied within a range of 0% to 100% by the controller U3.

Hydraulic System

Figure 7:
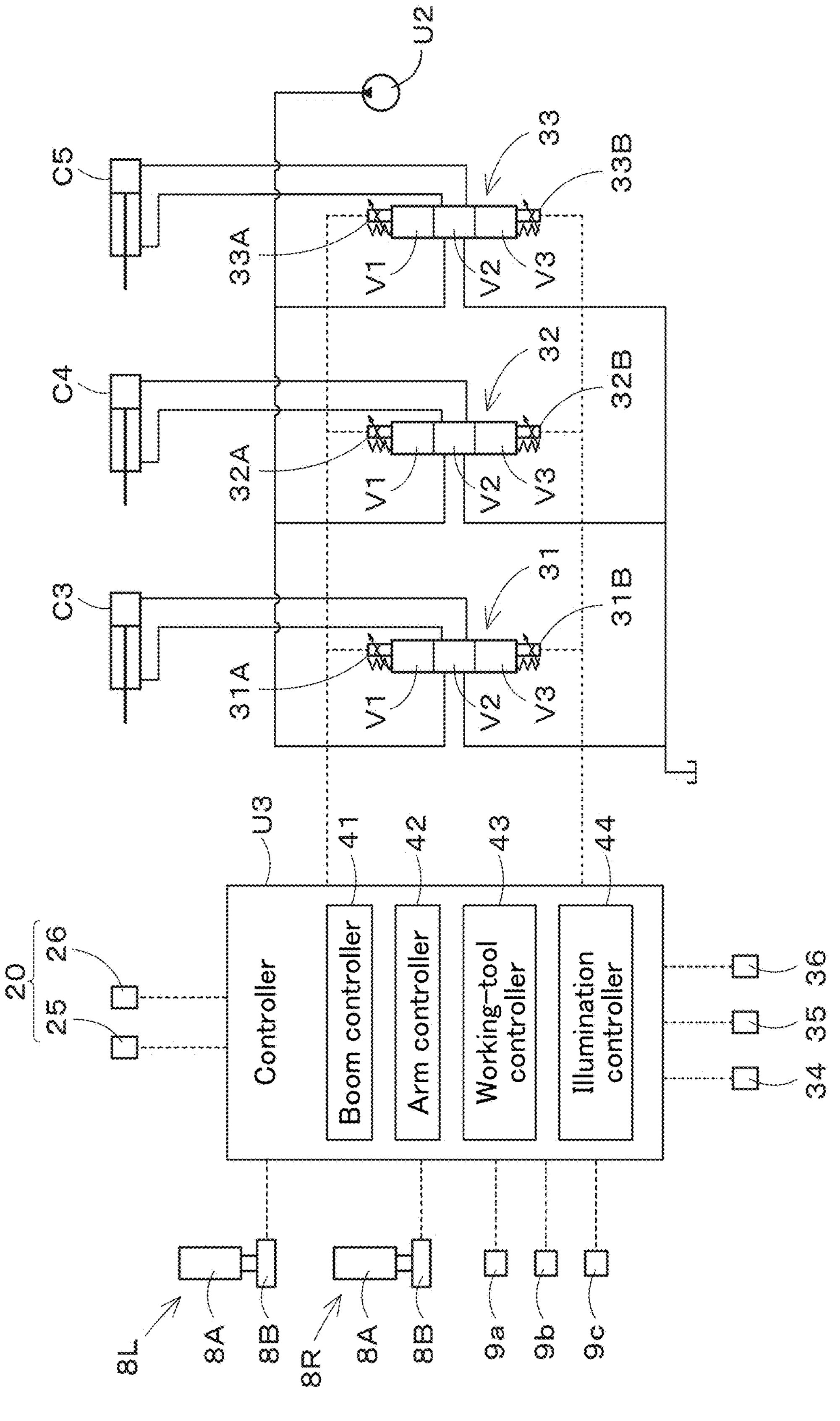
FIG. 7 is a diagram illustrating a hydraulic system of the working machine.

As described above, the working machine 1 includes a hydraulic system that drives the working device 4 by the extending and retracting operations of the hydraulic cylinders (hydraulic actuators) C3 to C5. More specifically, as illustrated in FIG. 7, the hydraulic system of the working machine 1 includes a boom control valve 31, an arm control valve 32, a working-tool control valve 33, the controller U3, the manipulators 8L and 8R, a boom angle sensor 34, an arm angle sensor 35, and a working-tool angle sensor 36. The manipulators 8L and 8R, the boom control valve 31, the arm control valve 32, the working-tool control valve 33, the boom angle sensor 34, the arm angle sensor 35, and the working-tool angle sensor 36 are each connected to the controller U3 via a communication cable.

The boom control valve 31, the arm control valve 32, and the working-tool control valve 33 are respectively connected to the boom cylinder C3, the arm cylinder C4, and the working-tool cylinder C5 via fluid passages. The boom control valve 31, the arm control valve 32, and the working-tool control valve 33 are each connected to the hydraulic pump U2 via a fluid passage.

The boom control valve 31, the arm control valve 32, and the working-tool control valve 33 are, for example, electromagnetic three-position switching valves. More specifically, the boom control valve 31 is a direct-acting spool switching valve that can be switched among a first valve position V1, a second valve position V2, and a third valve position V3 by energizing or de-energizing a first solenoid 31A and a second solenoid 31B. When the boom control valve 31 is switched to the first valve position V1, the boom cylinder C3 is extended by supply and discharge of the hydraulic fluid to and from the boom cylinder C3. In contrast, when the boom control valve 31 is switched to the second valve position V2, the boom cylinder C3 is retracted by the supply and discharge of the hydraulic fluid to and from the boom cylinder C3. As a result, the boom 14 is swung.

The arm control valve 32 is a direct-acting spool switching valve that can be switched among the first valve position V1, the second valve position V2, and the third valve position V3 by energizing or de-energizing a first solenoid 32A and a second solenoid 32B. When the arm control valve 32 is switched to the first valve position V1, the arm cylinder C4 is extended by supply and discharge of the hydraulic fluid to and from the arm cylinder C4. In contrast, when the arm control valve 32 is switched to the second valve position V2, the arm cylinder C4 is retracted by the supply and discharge of the hydraulic fluid to and from the arm cylinder C4. As a result, the arm 15 is swung.

The working-tool control valve 33 is a direct-acting spool switching valve that can be switched among the first valve position V1, the second valve position V2, and the third valve position V3 by energizing or de-energizing a first solenoid 33A and a second solenoid 33B. When the working-tool control valve 33 is switched to the first valve position V1, the working-tool cylinder C5 is extended by supply and discharge of the hydraulic fluid to and from the working-tool cylinder C5. In contrast, when the working-tool control valve 33 is switched to the second valve position V2, the working-tool cylinder C5 is retracted by the supply and discharge of the hydraulic fluid to and from the working-tool cylinder C5. As a result, the bucket 16 is swung.

The controller U3 includes a boom controller 41, an arm controller 42, and a working-tool controller 43. The above-mentioned switching operation of the boom control valve 31 is controlled by the boom controller 41, and the above-mentioned switching operations of the arm control valve 32 and the working-tool control valve 33 are controlled by the arm controller 42. In other words, the controller U3 controls the operations of the boom 14, the arm 15, and the bucket 16.

The controller U3 may be fabricated with hardware formed in an integrated circuit (an IC chip) or the like or may be fabricated with software using a computer. In the latter case, the computer includes a recording medium in which programs that implement the functions of the controller U3 and various data relating to the working machine 1 are recorded in a computer-readable manner, an arithmetic circuit such as a central processing unit (CPU) that executes instructions of the programs, random-access memory (RAM) that expands the programs and the various data, and so forth. The arithmetic circuit reads the programs from the recording media and executes the programs, so that the functions of the controller U3 are implemented.

Each of the manipulators 8L and 8R includes an operation lever 8A and a position sensor 8B. Each of the operation levers 8A can be manually swung in the front-rear and left-right directions from a neutral position. Each of the position sensors 8B detects a swing amount (an operation amount) of the corresponding operation lever 8A from the neutral position in the front-rear and left-right directions.

For example, when the operation lever 8A of the manipulator 8R on the right side is swung back and forth, the boom controller 41 (the controller U3) energizes or deenergizes the first solenoid 31A and the second solenoid 31B in accordance with the swing direction and the swing amount of the operation lever 8A, which are detected by the corresponding position sensor 8B, so as to switch the boom control valve 31. In other words, the boom controller 41 controls the swing of the boom 14.

In contrast, when the operation lever 8A of the manipulator 8L on the left side is swung back and forth, the arm controller 42 (the controller U3) energizes or deenergizes the first solenoid 32A and the second solenoid 32B in accordance with the swing direction and the swing amount of the operation lever 8A, which are detected by the corresponding position sensor 8B, so as to switch the arm control valve 32. In other words, the arm controller 42 controls the swing of the arm 15.

When the operation lever 8A of the manipulator 8R on the right side is swung left and right, the working-tool controller 43 (the controller U3) energizes or deenergizes the first solenoid 33A and the second solenoid 33B in accordance with the swing direction and the swing amount of the operation lever 8A, which are detected by the corresponding position sensor 8B, so as to switch the working-tool control valve 33. In other words, the working-tool controller 43 controls the swing of the bucket 16.

The boom angle sensor 34 detects a swing angle (a swing position) of the boom 14. The arm angle sensor 35 detects a swing angle (a swing position) of the arm 15. The working-tool angle sensor 36 detects a swing angle (a swing position) of the bucket 16. In the present example embodiment, potentiometers are used as the boom angle sensor 34, the arm angle sensor 35, and the working-tool angle sensor 36. However, the present invention is not limited to this, and other types of angle sensors may be used. Furthermore, the swing angles (the swing positions) of the boom 14, the arm 15, and the bucket 16 may be calculated on the basis of detection results obtained by detecting strokes (extension positions) of the boom cylinder C3, the arm cylinder C4, and the working-tool cylinder C5.

Illumination Controller

The controller U3 includes an illumination controller 44. The working lamp 20 (the first working lamp 25 and the second working lamp 26), the illumination operation member 9*a*, the first switch 9*b*, and the second switch 9*c* are each connected to the controller U3 via a communication cable. The output of the working lamp 20 is controlled by the illumination controller 44. In other words, the controller U3 controls an illumination operation of each of the first and second working lamps 25 and 26. More specifically, when the arm 15 has been swung in the arm-crowd direction and is within the crowd range P2 which is a portion of a predetermined swinging range that is located in the arm-crowd direction, the illumination controller 44 performs a first control to control the illuminance of the first working lamp (the first light source) 25 such that the illuminance of the first working lamp 25 is lower than when the arm 15 is within the dump range P3 which is another portion of the predetermined swinging range that is located downstream of the crowd range P2 in the arm-dump direction. In contrast, when the arm 15 has been swung in the arm-dump direction and is within the dump range P3, the illumination controller 44 performs a second control to control the illuminance of the second working lamp (the second light source) 26 such that the illuminance is lower than when the arm 15 is within the crowd range P2.

When the arm 15 is within an intermediate range P5 between the crowd range P2 and the dump range P3, the illumination controller 44 performs a third control to control the illuminance of the first working lamp (the first light source) 25 such that the illuminance of the first working lamp 25 is higher than when the arm 15 is within the crowd range P2 and control the illuminance of the second working lamp (the second light source) 26 such that the illuminance of the second working lamp 26 is higher than when the arm 15 is within the dump range P3.

When the boom 14 has been swung to a position higher than the predetermined set position S4 and is within a predetermined raising range P4, regardless of the operating status (the position) of the arm 15, the illumination controller 44 performs a fourth control to control the illuminance of the first working lamp (the first light source) 25 such that the illuminance of the first working lamp 25 is lower than when the boom 14 is within a lowering range P1 lower than the set position S4.

Furthermore, the illumination controller 44 performs a control to switch between enabling and disabling the fourth control in accordance with the operation of the first switch 9*b*, and a control to switch between enabling and disabling the first to third controls in accordance with the operation of the second switch 9*c*.

Figure 8:
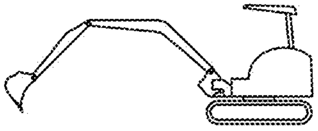
FIG. 8 is a diagram illustrating an example of the relationship between the operating status of the working device and an output of a working lamp.
Figure 8:
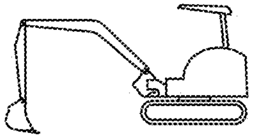
Figure 8:
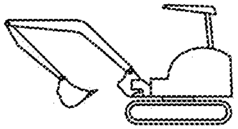

As illustrated in FIG. 8, in the present example embodiment, when a swing position (an arm angle) D2 of the arm 15 is within the crowd range P2, an output E1 of the first working lamp 25 is set to a minimum output (0%) (the first control). In contrast, an output E2 of the second working lamp 26 is set to a maximum output (100%). In other words, when the arm 15 is within the predetermined crowd range P2, the illumination controller 44 limits the illuminance of the first working lamp 25 to a low illuminance level.

In the present example embodiment, when the swing position (the arm angle) D2 of the arm 15 is within the dump range P3, the output E2 of the second working lamp 26 is set to the minimum output (0%) (the second control). In contrast, the output E1 of the first working lamp 25 is set to the maximum output (100%). In other words, the illumination controller 44 limits the illuminance of the second working lamp 26 to the low illuminance level when the arm 15 is within the predetermined dump range P3.

In the present example embodiment, when the swing position (the arm angle) D2 of the arm 15 is within the intermediate range P5, which is set between the crowd range P2 and the dump range P3, the output E1 of the first working lamp 25 and the output E2 of the second working lamp 26 are both set to the maximum output (100%) (the third control). In other words, the illumination controller 44 maintains both the illuminance of the first working lamp 25 and the second working lamp 26 at a high illuminance level while the arm 15 is within the intermediate range P5 between the predetermined crowd range P2 and the dump range P3.

Figure 11:
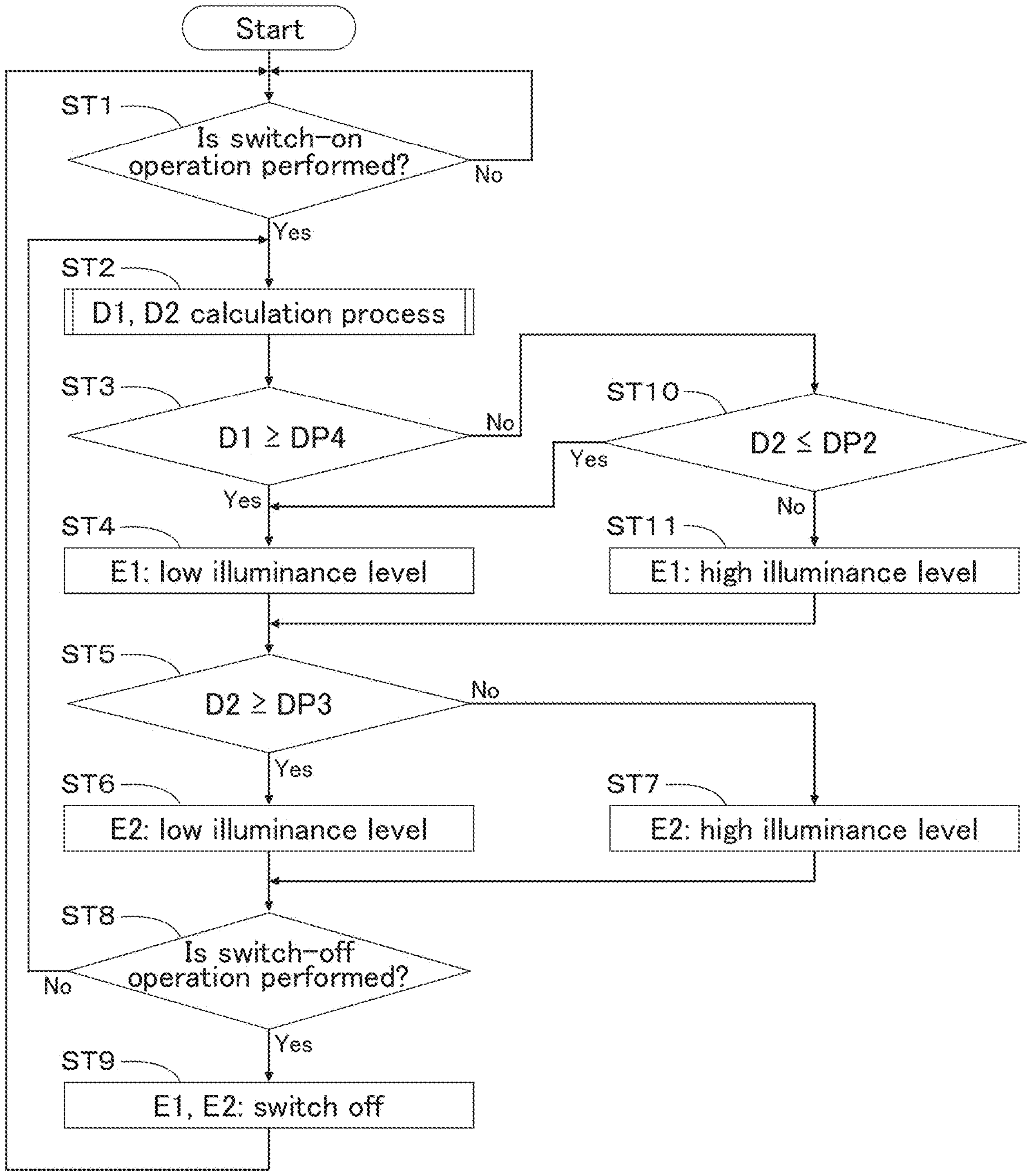
FIG. 11 is a flow chart illustrating an example of illumination control of the working lamp.

In the present example embodiment, as illustrated in the flowchart in FIG. 11, which will be described later, regardless of the operating status (the position) of the arm 15, the output E1 of the first working lamp 25 is set to the minimum output (0%) when the boom 14 has been swung upward above the set position S4 and is within the raising range P4 (the fourth control). In contrast, the output E2 of the second working lamp 26 is set in accordance with the operating status of the arm 15 through the first to third controls. In other words, when the boom 14 is within the predetermined raising range P4, the illumination controller 44 limits the illuminance of the first working lamp 25 to the low illuminance level.

Note that the output E1 of the first working lamp 25 when the arm 15 is within the crowd range P2, the output E2 of the second working lamp 26 when the arm 15 is within the dump range P3, and the output E1 of the first working lamp 25 when the boom 14 is within the raising range P4 are not limited to the minimum output (0%), which is a completely extinguished state. For example, the above-mentioned outputs E1 and E2 may each be set to an output (e.g., 1%) that can be considered a substantially extinguished state or may each be set to a low output (e.g., 20%) that does not bother nearby residents or others even when emitted toward nearby houses or automobiles.

Figure 9:
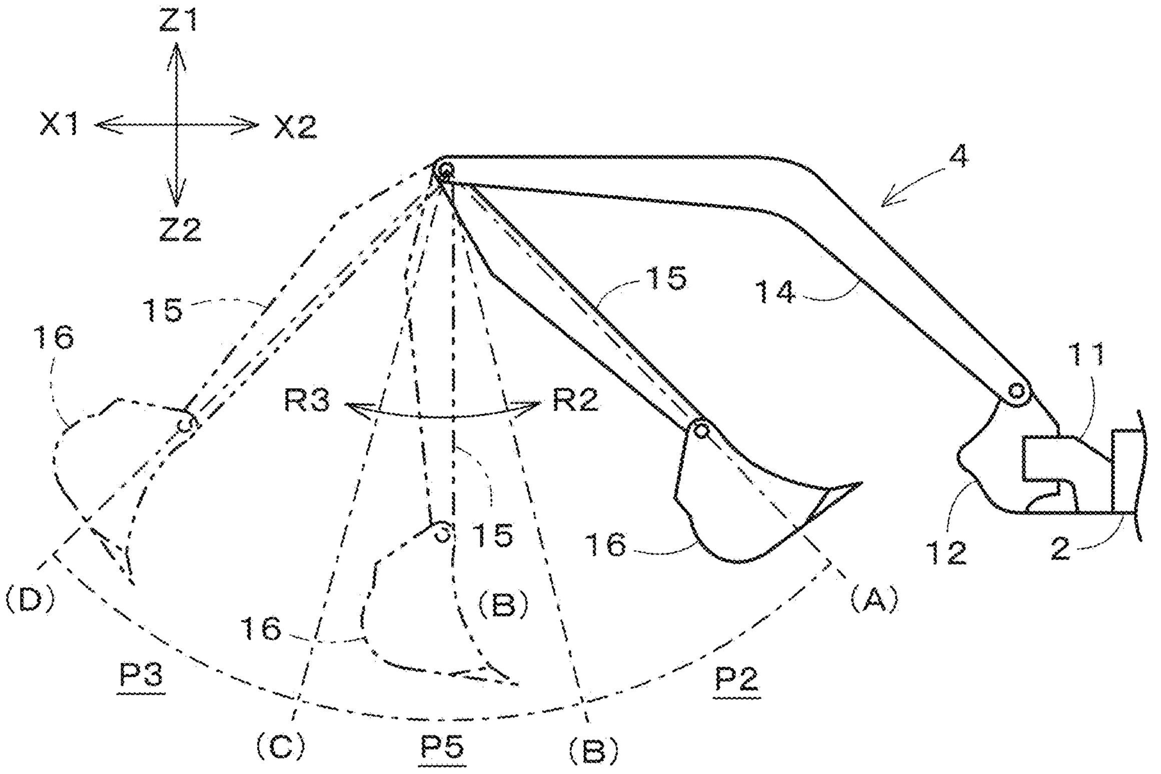
FIG. 9 is a schematic diagram of the working device and illustrates a swing range of the arm.

As illustrated in FIG. 9, in the present example embodiment, the crowd range P2 of the arm 15 in the first to third controls is set between a full crowd position (A) where the arm 15 stops swinging such that the bucket 16 does not interfere with either the boom cylinder C3 or the cylinder cover G3 and a first reference position (B) that the arm 15 reaches by being swung from the full crowd position (A) in the arm-dump direction by a predetermined angle (e.g., 30 degrees). In contrast, the dump range P3 of the arm 15 in the first to third controls is set between a limit position (D) that the arm 15 reaches by being swung, as a result of retracting the arm cylinder C4 to a predetermined limit position, in the arm-dump direction by a predetermined angle (e.g., 90 degrees from the full crowd position (A)) and a second reference position (C) that the arm 15 reaches by being swung in the arm-crowd direction by a predetermined angle (e.g., 30 degrees) from the limit position (D).

Figure 10:
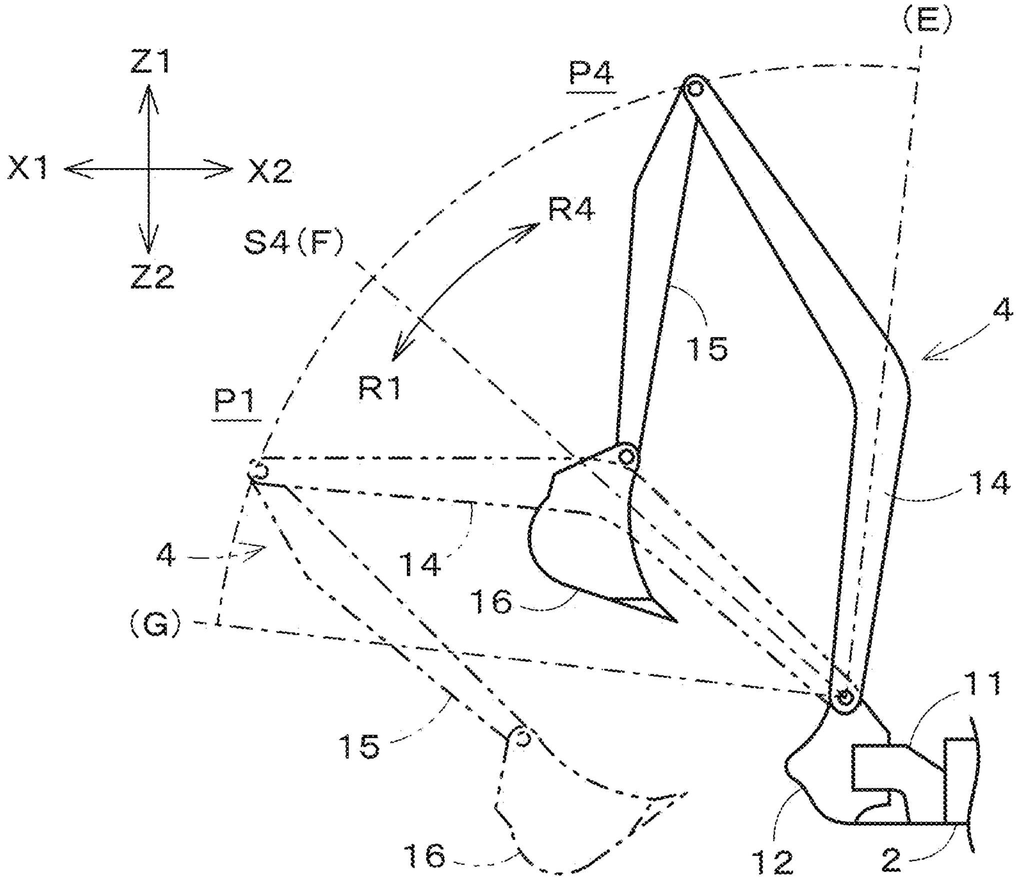
FIG. 10 is a schematic diagram of the working device and illustrates a swing range of the boom.

As illustrated in FIG. 10, in the present example embodiment, the raising range P4 of the boom 14 in the fourth control is set between a maximum raising position (E) where the boom 14 stops swinging so as not to interfere with either the canopy 5 or the machine body 2 and the set position S4 (F) that the boom 14 reaches by being swung in a lowering direction from the maximum raising position (E) by a predetermined angle (e.g., 55 degrees). In the present example embodiment, the set position S4 is set at a position where the distal-end extension 14T of the boom 14 extends substantially horizontally toward the front of the machine body 2. In contrast, the lowering range P1 of the boom 14 is set between the set position S4 (F) and a limit position (G) that the boom 14 reaches by being swung, as a result of retracting the boom cylinder C3 to a predetermined limit position, in the lowering direction by a predetermined angle (e.g., 90 degrees from the maximum raising position (E)).

An example of illumination control that is performed on the working lamp 20 by the illumination controller 44 (the controller U3) will be described with reference to the flowchart illustrated in FIG. 11. First, when the illumination operation member 9*a* performs a switch-on operation on the working lamp 20 (Yes in step ST1), the swing position (the boom angle) D1 of the boom 14 is calculated on the basis of a detection signal from the boom angle sensor 34, and the swing position (the arm angle) D2 of the arm 15 is calculated on the basis of a detection signal from the arm angle sensor 35 (ST2).

Here, if the boom angle D1 is equal to or larger than a reference raising angle DP4 indicating that the boom angle D1 is within the predetermined raising range P4 (Yes in step ST3), the output E1 of the first working lamp 25 is set to a predetermined low illuminance level (here, the minimum output) (ST4). Furthermore, in this case, if the arm angle D2 is equal to or larger than a reference dump angle DP3 indicating that the arm angle D2 is within the predetermined dump range P3 (Yes in step ST5), the output E2 of the second working lamp 26 is set to a predetermined low illuminance level (here, the minimum output) (ST6). If the arm angle D2 is smaller than the reference dump angle DP3 (No in step ST5), the output E2 of the second working lamp 26 is set to a predetermined high illuminance level (here, the maximum output) (ST7). In other words, if the boom 14 is within the raising range P4 when the switch-on operation is performed on the working lamp 20, the first working lamp 25 is limited to the low illuminance level. Regarding the second working lamp 26, if the arm 15 is within the dump range P3, the second working lamp 26 is limited to the low illuminance level, and if the arm 15 is not within the dump range P3, the second working lamp 26 is switched on at the high illuminance level.

After that, if the illumination operation member 9*a* performs a switch-off operation on the working lamp 20, (Yes in step ST8), both the first and second working lamps 25 and 26 are switched off (ST9), and the process returns to step ST1. In contrast, before the switch-on operation is performed on the working lamp 20 (No in step ST8), for example, if the operation lever 8A of the manipulator 8R on the right side is operated along the front-rear direction such that the boom 14 is swung downward, that is, if the boom angle D1 becomes smaller than the reference raising angle DP4 (No in step ST3), an illuminance limit of the first working lamp 25 is released, and the illuminances of the first working lamp 25 and the second working lamp 26 are set in accordance with the swing position D2 of the arm 15.

More specifically, if the boom 14 is swung downward as described above (No in step ST3), and if the arm angle D2 is equal to or smaller than a reference crowd angle DP2 indicating that the arm angle D2 is within the predetermined crowd range P2 (Yes in step ST10), the output E1 of the first working lamp 25 is set to a predetermined low illuminance level (here, the minimum output) (ST4). If the arm angle D2 is larger than the reference crowd angle DP2 (No in step ST10), the output E1 of the first working lamp 25 is set to a predetermined high illuminance level (here, the maximum output) (ST11). If the arm angle D2 is equal to or larger than the reference dump angle DP3 (Yes in ST5), the output E2 of the second working lamp 26 is set to the low illuminance level (ST6) as described above in steps ST5 to ST7. If the arm angle D2 is smaller than the reference dump angle DP3 (No in step ST5), the output E2 of the second working lamp 26 is set to the high illuminance level (ST7).

After that, for example, if the operation lever 8A of the manipulator 8L on the left side is operated along the front-rear direction such that the arm 15 is swung in the arm-crowd direction or the arm-dump direction, as described above in steps ST5 to ST7 and steps ST10, ST4, ST11, the illuminances of the first working lamp 25 and the second working lamp 26 are set in accordance with the swing position D2 of the arm 15.

If the first switch 9*b* performs a turn-off operation (disabling operation) of the fourth control before the switch-on operation is performed on the working lamp 20 in step ST1, step ST3 is skipped, and step ST10 and the subsequent steps are performed regardless of the swing position D1 of the boom 14. In other words, if the turn-off operation of the fourth control is performed, the illumination controller 44 turns off a function of limiting the illuminance of the first working lamp 25 on the basis of the swing position D1 of the boom 14 and sets the illuminances of the first working lamp 25 and the second working lamp 26 on the basis of the swing position D2 of the arm 15.

If the second switch 9*c* performs a turn-off operation (disabling operation) of the first to third controls before the switch-on operation is performed on the working lamp 20 in step ST1, step ST5 is skipped, and step ST7 is performed regardless of the swing position D1 of the arm 15. Alternatively, step ST10 is skipped, and step ST11 is performed. In other words, if the turn-off operation of the first to third controls is performed, the illumination controller 44 turns off a function of limiting the illuminances of the first and second working lamps 25 and 26 on the basis of the swing position D2 of the arm 15 and sets the illuminance of the first working lamp 25 on the basis of the swing position D1 of the boom 14.

Thus, if the turn-off operation of the fourth control and the turn-off operation of the first to third controls are both performed before the switch-on operation is performed on the working lamp 20 in step ST1, both the first working lamp 25 and the second working lamp 26 are constantly maintained at the high illuminance level regardless of the swing position D1 of the boom 14 and the swing position D2 of the arm 15.

Note that, in the present example embodiment, it is determined in step ST1 whether the operator manipulates the illumination operation member 9*a* to switch on the working lamp 20. However, the present invention is not limited to this. For example, a configuration may be employed in which the working lamp 20 is automatically switched on in accordance with a detection result obtained by a light receiving sensor that detects ambient light, and it may be determined in step ST1 whether the detection result obtained by the light receiving sensor satisfies a predetermined switch-on condition.

Other Example Embodiments

In the above-described example embodiment, when the arm 15 is within the intermediate range P5 between the crowd range P2 and the dump range P3, the output E1 of the first working lamp 25 and the output E2 of the second working lamp 26 are both maintained at the high illuminance level regardless of variations in the arm angle D2. However, when the arm 15 is within the intermediate range P5, the illuminances of the first and second working lamps 25 and 26 may be continuously varied in accordance with variations in the arm angle D2 (second example embodiment).

Figure 12:
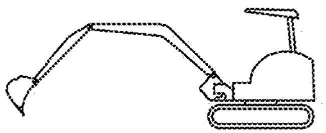
FIG. 12 is a diagram illustrating a second example of the relationship between the operating status of the working device and the output of the working lamp.
Figure 12:
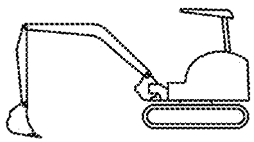
Figure 12:
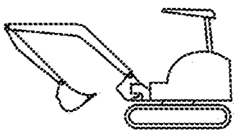

More specifically, as illustrated in FIG. 12, as the swing position (the arm angle) D2 of the arm 15 varies within the intermediate range P5 from the crowd range P2 toward the dump range P3 (in the arm-dump direction), the illumination controller 44 varies the output E1 of the first working lamp (the first light source) 25 such that the output E1 continuously increases (1% to 99%) and varies the output E2 of the second working lamp (the second light source) 26 such that the output E2 continuously decreases (99% to 1%). In contrast, as the swing position (the arm angle) D2 of the arm 15 varies within the intermediate range P5 from the dump range P3 toward the crowd range P2 (in the arm-crowd direction), the illumination controller 44 accordingly varies the output E1 of the first working lamp (the first light source) 25 such that the output E1 continuously decreases (99% to 1%) varies the output E2 of the second working lamp (the second light source) 26 such that the output E2 continuously increases (1% to 99%).

In the above-described example embodiment, when the arm 15 is within the crowd range P2, the output E1 of the first working lamp 25 is set to the low illuminance level, and the output E2 of the second working lamp 26 is set to the high illuminance level. When the arm 15 is within the dump range P3, the output E1 of the first working lamp 25 is set to the high illuminance level, and the output E2 of the second working lamp 26 is set to the low illuminance level. When the arm 15 is within the intermediate range P5 between the crowd range P2 and the dump range P3, the output E1 of the first working lamp 25 and the output E2 of the second working lamp 26 are both set to at the high illuminance level.

Figure 13:
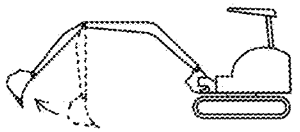
FIG. 13 is a diagram illustrating a third example of the relationship between the operating status of the working device and the output of the working lamp.
Figure 13:
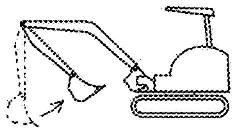

However, as illustrated in FIG. 13, while a predetermined intermediate position S5 that is located between the predetermined crowd range P2 and the dump range P3 functions as a reference, when the swing position (the arm angle) D2 of the arm 15 swings further toward the crowd range P2 than the intermediate position S5, the illumination controller 44 may set the output E1 of the first working lamp 25 to a predetermined low illuminance level (e.g., the minimum output) and may set the output E2 of the second working lamp 26 to a predetermined high illuminance level (e.g., the maximum output). When the swing position (the arm angle) D2 of the arm 15 swings further toward the dump range P3 than the intermediate position S5, the illumination controller 44 may set the output E1 of the first working lamp 25 to a predetermined high illuminance level (e.g., maximum output) and may set the output E2 of the second working lamp 26 to a predetermined low illuminance level (e.g., the minimum output) (third example embodiment).

In the above example embodiment, when the boom 14 has been swung upward above the set position S4 and is within the predetermined raising range P4, the output E2 of the second working lamp 26 is set in accordance with the operating status of the arm 15. However, when the boom 14 within the raising range P4, the output E2 of the second working lamp (the second light source) 26 may be controlled to be higher than the illuminance of the output E2 of the second working lamp 26 in the case where the boom 14 is within the lowering range P1 below the set position S4 (fourth example embodiment).

Figure 14:
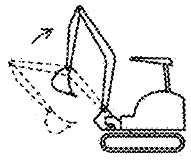
FIG. 14 is a diagram illustrating a fourth example of the relationship between the operating status of the working device and the output of the working lamp.
Figure 14:
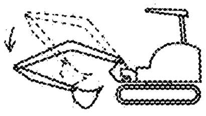

More specifically, as illustrated in FIG. 14, when the boom 14 has been swung below the set position S4 and is within the predetermined lowering range P1, the illumination controller 44 sets the output E1 of the first working lamp (the first light source) 25 to a predetermined high illuminance level (e.g., the maximum output) and sets the output E2 of the second working lamp (the second light source) 26 to a predetermined low illuminance level (e.g., the minimum output) regardless of the operating status (the position) of the arm 15. In contrast, when the boom 14 has been swung above the set position S4 and is within the predetermined raising range P4, the illumination controller 44 sets the output E1 of the first working lamp 25 to a predetermined low illuminance level (e.g., the minimum output) and sets the output E2 of the second working lamp (the second light source) 26 to a predetermined high illuminance level (e.g., the maximum output) regardless of the operating status (the position) of the arm 15. In other words, the output E2 of the second working lamp 26 is set to be higher than the output E2 of the second working lamp 26 in the case where the boom 14 is within the lowering range P1.

Note that, in the fourth example embodiment, when the boom 14 has been swung below the set position S4 and is within the predetermined lowering range P1, the output E1 of the first working lamp 25 may be set in accordance with the operating status (the position) of the arm 15 as in the other example embodiments.

In the above-described example embodiment, the working lamp 20 is provided in the gap H inside the first cylinder bracket 21, which is provided at the boom lower surface portion 14A. However, the working lamp 20 may be provided on an outer surface portion of the first cylinder bracket 21 or may be provided on a side surface portion of the boom 14 as long as the working lamp 20 can appropriately illuminate the work area in front of the boom 14 and the work area below the boom 14. Alternatively, the working lamp 20 may be provided on the boom lower surface portion 14A at a position (e.g., at a lower surface of the distal-end extension 14T of the boom 14) that is different from the first cylinder bracket 21.

In the above-described example embodiment, the first working lamp 25 and the second working lamp 26 are configured as separate members. However, the first working lamp 25 and the second working lamp 26 may be integrally configured by being incorporated into a single casing. Furthermore, instead of the first working lamp 25 and the second working lamp 26, the working lamp 20 may include two light sources (the first light source and the second light source) corresponding to the first working lamp 25 and the second working lamp 26 and may be configured to be capable of individually controlling the illuminance of each of these light sources. Alternatively, a single light source may be split into two independently controllable light sources.

In the above-described example embodiment, the working lamp 20 is configured to illuminate the work area around the boom 14 by the two light sources (the first light source 25 and the second light source 26) with different optical axis directions from each other. However, the working lamp 20 include three or four or more light sources with different optical axis directions from each other and may be configured to illuminate the work area around the boom 14 by these multiple light sources.

Figure 15:
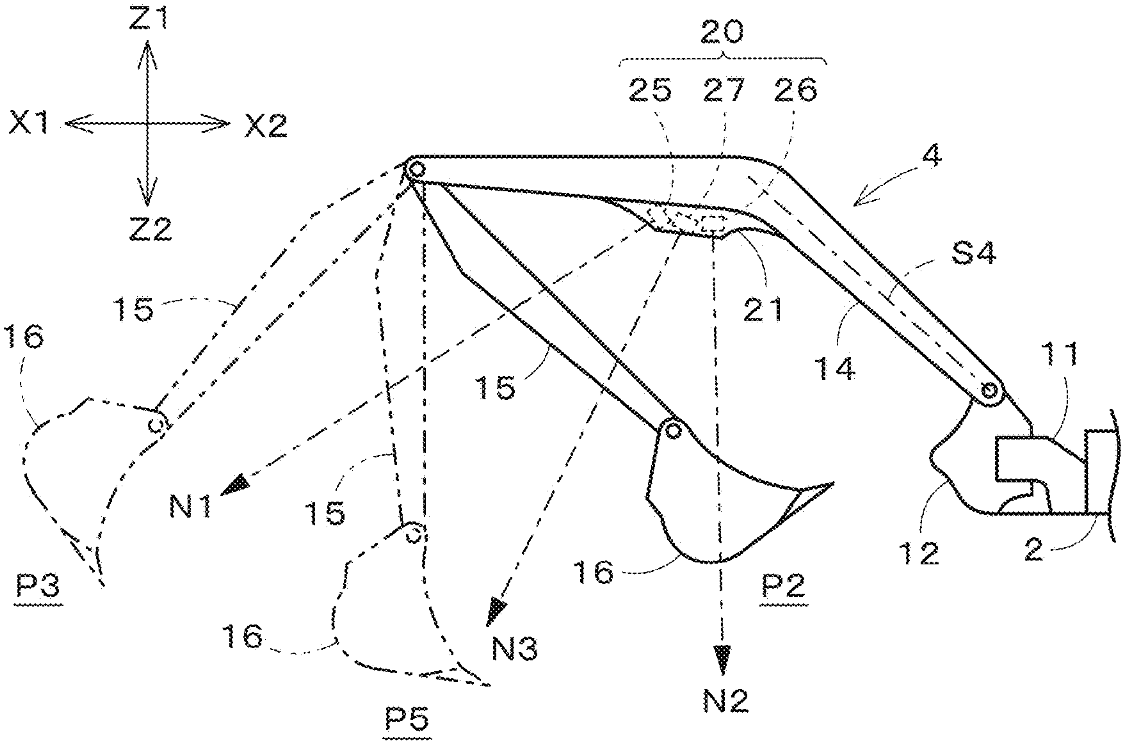
FIG. 15 is a schematic diagram of the working device and illustrates another configuration of the working lamp.

For example, as illustrated in FIG. 15, the working lamp 20 includes three light sources (the first light source 25, the second light source 26, and a third light source 27) with different optical axis directions from each other. The working lamp 20 includes the first working lamp (the first light source) 25 that projects light in a direction similar to the direction in which the first working lamp 25 projects light in the above-described example embodiment, the second working lamp (the second light source) 26 that projects light in a direction similar to the direction in which the second working lamp 26 projects light in the above-described example embodiment, and the third working lamp (the third light source) 27 that projects light in an intermediate direction between the direction in which the first working lamp 25 projects light and the direction in which the second working lamp 26 projects light.

The third working lamp 27 is attached to the first cylinder bracket 21 at a position between the first working lamp 25 and the second working lamp 26 and is in a position in which a light emitting surface (the optical axis direction) thereof is oriented (in the direction of arrow N3 in FIG. 11) more to the proximal end of the boom than that of the first working lamp 25 is to the proximal end of the boom and oriented more to the distal end of the boom than that of the second working lamp 26 is to the distal end of the boom. In other words, the optical axis direction N3 of the third working lamp 27 is oriented more to the distal end of the boom 14 than the optical axis direction of the second working lamp 26 is to the distal end of the boom, and oriented more to the proximal end of the boom 14 than the optical axis direction of the first working lamp 25 is to the proximal end of the boom. Thus, the working lamp 20 illuminates a position far from the machine body 2 by the first working lamp 25, illuminates a position close to the machine body 2 by the second working lamp 26, and illuminates an intermediate position between these positions by the third working lamp 27. In the present example embodiment, when the arm 15 is within the dump range P3, the first working lamp 25 illuminates the surrounding area of the bucket 16. When the arm 15 is within the crowd range P2, the second working lamp 26 illuminates the surrounding area of the bucket 16. When the arm 15 is within the intermediate range P5, the third working lamp 27 illuminates the surrounding area of the bucket 16.

When the arm 15 is within the intermediate range P5 between the crowd range P2 and the dump range P3, the illumination controller 44 performs a fifth control to control the illuminance of the third working lamp 27 such that the illuminance the third working lamp 27 is higher than at least one of the illuminance of the third working lamp 27 when the arm 15 is within the crowd range P2 or the illuminance of the third working lamp 27 when the arm 15 is within the dump range P3.

Figure 16:
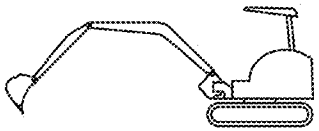
FIG. 16 is a diagram illustrating a fifth example of the relationship between the operating status of the working device and the output of the working lamp.
Figure 16:
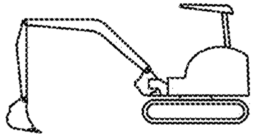
Figure 16:
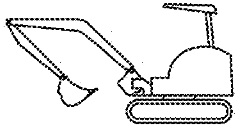

More specifically, as illustrated in FIG. 16, when the swing position (the arm angle) D2 of the arm 15 is within the crowd range P2, the output E1 of the first working lamp 25 and an output E3 of the third working lamp 27 are both set to the minimum output (0%). In contrast, the output E2 of the second working lamp 26 is set to the maximum output (100%). When the swing position (the arm angle) D2 of the arm 15 is within the dump range P3, the output E2 of the second working lamp 26 and the output E3 of the third working lamp 27 are both set to the minimum output (0%). In contrast, the output E1 of the first working lamp 25 is set to the maximum output (100%).

Furthermore, when the swing position (the arm angle) D2 of the arm 15 is within the intermediate range P5, the output E1 of the first working lamp 25 and the output E2 of the second working lamp 26 are both set to an intermediate output (50%). In contrast, the output E3 of the third working lamp 27 is set to the maximum output (100%).

In other words, while the arm 15 is within the intermediate range P5 between the crowd range P2 and the dump range P3, the illumination controller 44 maintains the illuminance of the third working lamp 27 at a high illuminance level and limits the illuminances of the first and second working lamps 25 and 26 to a medium illuminance level (a fifth example).

Note that, in the present example embodiment, when the arm 15 is within the intermediate range P5, one or both of the output E1 of the first working lamp 25 and the output E2 of the second working lamp 26 may be set to the maximum output (the high illuminance level) or may be set to the minimum output (the low illuminance level). Furthermore, when the arm 15 is within the dump range P3 or in the crowd range P2, the output E3 of the third working lamp 27 may be set to the maximum output (the high illuminance level).

When the arm 15 is within the crowd range P2 or the dump range P3, the output E3 of the third working lamp 27 may be continuously varied within a predetermined range (e.g., 0% to 99%) in accordance with variations in the swing position D2 of the arm 15.

Figure 17:
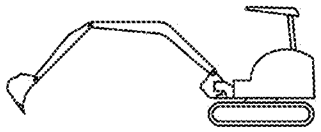
FIG. 17 is a diagram illustrating a sixth example of the relationship between the operating status of the working device and the output of the working lamp.
Figure 17:
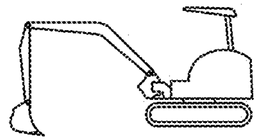
Figure 17:
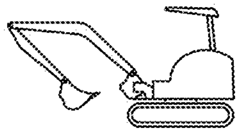

More specifically, as illustrated in FIG. 17, as the arm 15 is within the intermediate range P5 and the swing position (the arm angle) D2 of the arm 15 varies from the crowd range P2 toward the dump range P3 (in the arm-dump direction), the output E1 of the first working lamp (the first light source) 25 is varied to continuously increase (1% to 99%), and the output E2 of the second working lamp (the second light source) 26 is varied to continuously decrease (99% to 1%). In contrast, as the swing position (the arm angle) D2 of the arm 15 varies from the dump range P3 toward the crowd range P2 (in the arm-crowd direction), the output E1 of the first working lamp (first light source) 25 is varied to continuously decrease (99% to 1%), and the output E2 of the second working lamp (second light source) 26 is varied to continuously increase (1% to 99%).

When the arm 15 is within the crowd range P2, as the swing position (the arm angle) D2 of the arm 15 varies in the arm-dump direction, the output E3 of the third working lamp 27 is varied to continuously increase (0% to 99%). In contrast, as the swing position (the arm angle) D2 of the arm 15 varies in the arm-crowd direction, the output E3 of the third working lamp 27 is varied to continuously decrease (99% to 0%).

When the arm 15 is within the dump range P3, as the swing position (the arm angle) D2 of the arm 15 varies in the arm-dump direction, the output E3 of the third working lamp 27 is varied to continuously decrease (99% to 0%). In contrast, as the swing position (the arm angle) D2 of the arm 15 varies in the arm-crowd direction, the output E3 of the third working lamp 27 is varied to continuously increase (0% to 99%).

In other words, while the arm 15 is within the intermediate range P5 between the crowd range P2 and the dump range P3, the illumination controller 44 maintains the illuminance of the third working lamp 27 at a higher illuminance level than the illuminance in the case where the arm 15 is within the crowd range P2 or the dump range P3 and continuously varies the illuminance of the third working lamp 27 from the high illuminance level to the low illuminance level as the arm 15 swings in the arm-crowd direction or the arm-dump direction out of the intermediate range P5 (a sixth example).

The present invention provides working machines 1 described in the following items.

(Item 1) A working machine 1 including a machine body 2, a boom 14 including a proximal end coupled to the machine body 2 such that the boom 14 is swingable up and down, an arm 15 coupled to a distal end of the boom 14 such that the arm 15 is swingable in an arm-crowd direction which is a direction toward the boom 14 and an arm-dump direction which is a direction away from the boom 14, a working tool 16 attached to a distal end of the arm 15, a working lamp 20 provided at the boom 14 to illuminate a work area around the boom 14, and an illumination controller 44 configured or programmed to control an illumination operation of the working lamp 20, wherein the working lamp 20 includes a first light source 25 and a second light source 26 with different optical axis directions from each other, the optical axis direction N1 of the first light source 25 is oriented more to the distal end of the boom 14 than the optical axis direction of the second light source 26 is to the distal end of the boom 14, and the optical axis direction N2 of the second light source 26 is oriented more to the proximal end of the boom 14 than the optical axis direction of the first light source 25 is to the proximal end of the boom 14, and the illumination controller 44 is configured or programmed to, when the arm 15 is within a crowd range P2, perform a first control to control an illuminance of the first light source 25 such that the illuminance of the first light source 25 is lower than when the arm 15 is within a dump range P3, the crowd range P2 being a portion of a swinging range of the arm 15 that is located in the arm-crowd direction, the dump range P3 being another portion of the swinging range that is located downstream of the crowd range P2 in the arm-dump direction.

With the working machine 1 according to item 1, since the illuminance of the first light source 25 is controlled in accordance with the swing position of the arm 15, power consumption during work can be reduced. Furthermore, since the illuminance of the first light source 25 is controlled as described above, it is also possible to eliminate or reduce the likelihood that the first light source 25 will unnecessarily illuminate areas outside the work area when the boom 14 is raised high, making it possible to appropriately illuminate the work area.

(Item 2) The working machine 1 according to item 1, wherein the illumination controller 44 is configured or programmed to, when the arm 15 is within the dump range P3, perform a second control to control an illuminance of the second light source 26 such that the illuminance of the second light source 26 is lower than when the arm 15 is within the crowd range P2.

With the working machine 1 according to item 2, since the illuminance of the first and second light sources 25 and 26 is controlled in accordance with the swing position of the arm 15, the work area can be appropriately illuminated, and the power consumption during work can be further reduced.

(Item 3) The working machine 1 according to item 1 or 2, wherein the illumination controller 44 is configured or programmed to, when the arm 15 is within an intermediate range P5 between the crowd range P2 and the dump range P3, perform a third control to control the illuminance of the first light source 25 such that the illuminance of the first light source 25 is higher than when the arm 15 is within the crowd range P2, and control the illuminance of the second light source 26 such that the illuminance of the second light source 26 is higher than when the arm 15 is within the dump range P3.

With the working machine 1 according to item 3, when the arm 15 is within the intermediate range P5, the surrounding area of the arm 15 can be appropriately illuminated by the first light source 25 and the second light source 26.

(Item 4) The working machine 1 according to item 3, wherein the illumination controller 44 is configured or programmed to, in the third control, when the arm 15 is within the intermediate range P5, control the illuminance of the first light source 25 such that the illuminance of the first light source 25 continuously decreases as the arm 15 swings in a direction from the dump range P3 toward the crowd range P2, and control the illuminance of the first light source 25 such that the illuminance of the first light source 25 continuously increases as the arm 15 swings in a direction from the crowd range P2 toward the dump range P3.

With the working machine 1 according to item 4, the brightness of the work area can be smoothly changed as the arm 15 swings between the crowd range P2 and the dump range P3, allowing the operator to concentrate more on work. Therefore, the work performance is improved.

(Item 5) The working machine 1 according to item 3 or 4, wherein the illumination controller 44 is configured or programmed to perform, in the third control, when the arm 15 is within the intermediate range P5, control the illuminance of the second light source 26 such that the illuminance of the second light source 26 continuously increases as the arm 15 swings in a direction from the dump range P3 toward the crowd range P2, and control the illuminance of the second light source 26 such that the illuminance of the second light source 26 continuously decreases as the arm 15 swings in a direction from the crowd range P2 toward the dump range P3.

With the working machine 1 according to item 5, the illuminance of the second light source 26 can be gradually increased or reduced as the arm 15 swings between the crowd range P2 and the dump range P3, making it possible to more appropriately illuminate the work area during work.

(Item 6) The working machine 1 according to any one of items 3 to 5, wherein the illumination controller 44 is configured or programmed to, when the boom 14 has been swung to a position higher than a predetermined set position S4, regardless of an operating status of the arm 15, perform a fourth control to control the illuminance of the first light source 25 such that the illuminance of the first light source 25 is lower than when the boom 14 is positioned lower than the set position S4.

(Item 7) A working machine 1 including a machine body 2, a boom 14 including a proximal end coupled to the machine body 2 such that the boom 14 is swingable up and down, an arm 15 coupled to a distal end of the boom 14 such that the arm 15 is swingable in an arm-crowd direction which is a direction toward the boom 14 and an arm-dump direction which is a direction away from the boom 14, a working tool 16 attached to a distal end of the arm 15, a working lamp 20 provided at the boom 14 to illuminate a work area around the boom 14, and an illumination controller 44 configured or programmed to control an illumination operation of the working lamp 20, wherein the working lamp 20 includes a first light source 25 and a second light source 26 with different optical axis directions from each other, the optical axis direction N1 of the first light source 25 is oriented more to the distal end of the boom 14 than the optical axis direction of the second light source 26 is to the distal end of the boom 14, and the optical axis direction N2 of the second light source 26 is oriented more to the proximal end of the boom 14 than the optical axis direction of the first light source 15 is to the proximal end of the boom 14, and the illumination controller 44 is configured or programmed to, when the boom 14 has been swung to a position higher than a predetermined set position S4, regardless of an operating status of the arm 15, perform a fourth control to control an illuminance of the first light source 25 such that the illuminance of the first light source 25 is lower than when the boom 14 is positioned lower than the set position S4.

With the working machine 1 according to items 6 and 7, unnecessary illumination of areas outside the work area by the first light source 25 can be reliably prevented or reduced when the boom 14 is raised high, and thus the work area can be more appropriately illuminated, resulting in a contribution to a reduction in power consumption.

(Item 8) The working machine 1 according to item 6 or 7, further including a first switch 9*b* to be operated to enable and disable the fourth control performed by the illumination controller 44.

With the working machine 1 according to item 8, it is possible to freely switch between enabling and disabling the fourth control. Therefore, it is possible to select the illumination control for the working lamp 20 depending on the manner in which work is performed, such as disabling the fourth control when mainly performing the work to load earth etc., onto a high location or excavate a high location. Thus, convenience is improved.

(Item 9) The working machine 1 according to any one of items 6 to 8, wherein the illumination controller 44 is configured or programmed to, when the boom 14 has been swung to a position higher than a predetermined set position S4, regardless of an operating status of the arm 15, control an illuminance of the second light source 26 such that the illuminance of the second light source 26 is higher than when the boom 14 is positioned lower than the set position S4.

With the working machine 1 according to item 9, the work area can be appropriately illuminated by the first light source 25 when the boom 14 is low, and the work area can be appropriately illuminated by the second light source 26 when the boom 14 is high. Thus, the work area around the boom 14 can always be appropriately illuminated by the working lamp 20 alone (first working lamp 25, second working lamp 26) which is provided on the boom 14.

(Item 10) The working machine 1 according to any one of items 3 to 6, further including a second switch 9*c* to be operated to enable and disable the first to third controls performed by the illumination controller 44.

With the working machine 1 according to item 10, it is possible to freely switch between enabling and disabling the first to third controls. Therefore, it is possible to select the illumination control for the working lamp 20 depending on the manner in which work is performed, such as disabling the first to third controls when performing excavation work while widely illuminating a low location. Thus, convenience is improved.

(Item 11) The working machine 1 according to item 1 or 10, wherein the second light source 26 is operable to illuminate a surrounding area of the working tool 16 when the arm 15 is within a crowd range P2, the crowd range P2 being a portion of a swinging range of the arm 15 that is located in the arm-crowd direction, and the first light source 25 is operable to illuminate the surrounding area of the working tool 16 when the arm 15 is within a dump range P3, the dump range P3 being another portion of the swinging range that is located downstream of the crowd range P2 in the arm-dump direction.

With the working machine 1 according to item 11, even when the first control and the second control are performed, the surrounding area of the working tool 16 can be illuminated by the first light source 25 and the second light source 26 in a focused manner, and thus the work performance is not impaired.

(Item 12) The working machine 1 according to any one of items 1 to 11, further including a boom cylinder C3 connected between the machine body 2 and the boom 14 to cause the boom 14 to swing, wherein the boom 14 is provided with a cylinder bracket 21 to support an end portion of the boom cylinder C3 such that the boom cylinder C3 is rotatable, and the working lamp 20 is provided in a gap H inside the cylinder bracket 21.

With the working machine 1 according to item 12, light emitted from the working lamp 20 is less likely to unnecessarily leak outside the work area, and therefore the work area can be more appropriately illuminated. Furthermore, since the working lamp 20 is not exposed to the outside of the working device 4, it is possible to eliminate or reduce the likelihood that illumination failures such as a change in the direction of light and breakage of the working lamp 20 will be caused by contact with external objects such as tree branches, and also possible to improve the design of the working machine 1 as a whole.

(Item 13) The working machine 1 according to any one of items 1 to 12, wherein the working lamp 20 includes a third light source 27 with an optical axis direction oriented more to the distal end of the boom 14 than the optical axis direction of the second light source 26 is to the distal end of the boom 14 and oriented more to the proximal end of the boom 14 than the optical axis direction of the first light source 25 is to the proximal end of the boom 14, and the illumination controller 44 is configured or programmed to, when the arm 15 is within an intermediate range P5 between a crowd range P2 and a dump range P3, perform a fifth control to control an illuminance of the third light source 27 such that the illuminance of the third light source 27 is higher than at least one of the illuminance of the third light source 27 when the arm 15 is within the crowd range P2 or the illuminance of the third light source 27 when the arm 15 is within the dump range P3, the crowd range P2 being a portion of a swinging range of the arm 15 that is located in the arm-crowd direction, the dump range P3 being another portion of the swinging range that is located downstream of the crowd range P2 in the arm-dump direction.

With the working machine 1 according to item 13, when the arm 15 is within the intermediate range P5, the surrounding area of the arm 15 can be appropriately illuminated by the third light source 27.

While example embodiments of the present invention have been described above, it is to be understood that variations and modifications will be apparent to those skilled in the art without departing from the scope and spirit of the present invention. The scope of the present invention, therefore, is to be determined solely by the following claims.

In the above example embodiments, a case has been described in which the present invention is applied to a working machine, such as a backhoe or the like. However, the target to which the present invention is to be applied is not limited to this, and for example, the present invention may be applied to any other construction machines such as a wheel loader, a compact track loader, a skid-steer loader, and the like or may be applied to agricultural machines such as a tractor, a combine, a rice transplanter, a lawn mower, and the like.

What is claimed is:

1. A working machine comprising:

a machine body;

a boom including a proximal end coupled to the machine body such that the boom is swingable up and down;

an arm coupled to a distal end of the boom such that the arm is swingable in an arm-crowd direction which is a direction toward the boom and an arm-dump direction which is a direction away from the boom;

a working tool attached to a distal end of the arm;

a working lamp provided at the boom to illuminate a work area around the boom; and an illumination controller configured or programmed to control an illumination operation of the working lamp; wherein the working lamp includes a first light source and a second light source with different optical axis directions from each other;

the optical axis direction of the first light source is oriented more to the distal end of the boom than the optical axis direction of the second light source is to the distal end of the boom, and the optical axis direction of the second light source is oriented more to the proximal end of the boom than the optical axis direction of the first light source is to the proximal end of the boom; and the illumination controller is configured or programmed to, when the arm is within a crowd range, perform a first control to control an illuminance of the first light source such that the illuminance of the first light source is lower than when the arm is within a dump range, the crowd range being a portion of a swinging range of the arm that is located in the arm-crowd direction, the dump range being another portion of the swinging range that is located downstream of the crowd range in the arm-dump direction.

2. The working machine according to claim 1, wherein the illumination controller is configured or programmed to, when the arm is within the dump range, perform a second control to control an illuminance of the second light source such that the illuminance of the second light source is lower than when the arm is within the crowd range.

3. The working machine according to claim 2, wherein the illumination controller is configured or programmed to, when the arm is within an intermediate range between the crowd range and the dump range, perform a third control to control the illuminance of the first light source such that the illuminance of the first light source is higher than when the arm is within the crowd range, and control the illuminance of the second light source such that the illuminance of the second light source is higher than when the arm is within the dump range.

4. The working machine according to claim 3, wherein the illumination controller is configured or programmed to perform, in the third control, when the arm is within the intermediate range, control the illuminance of the first light source such that the illuminance of the first light source continuously decreases as the arm swings in a direction from the dump range toward the crowd range, and control the illuminance of the first light source such that the illuminance of the first light source continuously increases as the arm swings in a direction from the crowd range toward the dump range.

5. The working machine according to claim 3, wherein the illumination controller is configured or programmed to perform, the third control, when the arm is within the intermediate range, control the illuminance of the second light source such that the illuminance of the second light source continuously increases as the arm swings in a direction from the dump range toward the crowd range, and control the illuminance of the second light source such that the illuminance of the second light source continuously decreases as the arm swings in a direction from the crowd range toward the dump range.

6. The working machine according to claim 3, wherein the illumination controller is configured or programmed to, when the boom has been swung to a position higher than a predetermined set position, regardless of an operating status of the arm, perform a fourth control to control the illuminance of the first light source such that the illuminance of the first light source is lower than when the boom is positioned lower than the set position.

7. The working machine according to claim 6, further comprising:

a first switch to be operated to enable and disable the fourth control performed by the illumination controller.

8. The working machine according to claim 6, wherein the illumination controller is configured or programmed to, when the boom has been swung to a position higher than a predetermined set position, regardless of an operating status of the arm, control the illuminance of the second light source such that the illuminance of the second light source is higher than when the boom is positioned lower than the set position.

9. The working machine according to claim 3, further comprising:

a second switch to be operated to enable and disable the first to third controls performed by the illumination controller.

10. The working machine according to claim 1, wherein the second light source is operable to illuminate a surrounding area of the working tool when the arm is within the crowd range; and the first light source is operable to illuminate the surrounding area of the working tool when the arm is within the dump range.

11. The working machine according to claim 1, further comprising:

a boom cylinder connected between the machine body and the boom to cause the boom to swing; wherein the boom is provided with a cylinder bracket to support an end portion of the boom cylinder such that the boom cylinder is rotatable; and the working lamp is provided in a gap inside the cylinder bracket.

12. The working machine according to claim 1, wherein the working lamp includes a third light source with an optical axis direction oriented more to the distal end of the boom than the optical axis direction of the second light source is to the distal end of the boom and oriented more to the proximal end of the boom than the optical axis direction of the first light source is to the proximal end of the boom; and the illumination controller is configured or programmed to, when the arm is within an intermediate range between the crowd range and the dump range, perform a fifth control to control an illuminance of the third light source such that the illuminance of the third light source is higher than at least one of the illuminance of the third light source when the arm is within the crowd range or the illuminance of the third light source when the arm is within the dump range.

13. A working machine comprising:

a machine body;

a boom including a proximal end coupled to the machine body such that the boom is swingable up and down;

an arm coupled to a distal end of the boom such that the arm is swingable in an arm-crowd direction which is a direction toward the boom and an arm-dump direction which is a direction away from the boom;

a working tool attached to a distal end of the arm;

a working lamp provided at the boom to illuminate a work area around the boom; and an illumination controller configured or programmed to control an illumination operation of the working lamp; wherein the working lamp includes a first light source and a second light source with different optical axis directions from each other;

the optical axis direction of the first light source is oriented more to the distal end of the boom than the optical axis direction of the second light source is to the distal end of the boom, and the optical axis direction of the second light source is oriented more to the proximal end of the boom than the optical axis direction of the first light source is to the proximal end of the boom; and the illumination controller is configured or programmed to, when the boom has been swung to a position higher than a predetermined set position, regardless of an operating status of the arm, perform a fourth control to control an illuminance of the first light source such that the illuminance of the first light source is lower than when the boom is positioned lower than the set position.

14. The working machine according to claim 13, further comprising:

a first switch to be operated to enable and disable the fourth control performed by the illumination controller.

15. The working machine according to claim 13, wherein the illumination controller is configured or programmed to, when the boom has been swung to a position higher than a predetermined set position, regardless of an operating status of the arm, control an illuminance of the second light source such that the illuminance of the second light source is higher than when the boom is positioned lower than the set position.

16. The working machine according to claim 13, wherein the second light source is operable to illuminate a surrounding area of the working tool when the arm is within a crowd range, the crowd range being a portion of a swinging range of the arm that is located in the arm-crowd direction; and the first light source is operable to illuminate the surrounding area of the working tool when the arm is within a dump range, the dump range being another portion of the swinging range that is located downstream of the crowd range in the arm-dump direction.

17. The working machine according to claim 13, further comprising:

a boom cylinder connected between the machine body and the boom to cause the boom to swing; wherein the boom is provided with a cylinder bracket to support an end portion of the boom cylinder such that the boom cylinder is rotatable; and the working lamp is provided in a gap inside the cylinder bracket.

18. The working machine according to claim 13, wherein the working lamp includes a third light source with an optical axis direction oriented more to the distal end of the boom than the optical axis direction of the second light source is to the distal end of the boom and oriented more to the proximal end of the boom than the optical axis direction of the first light source is to the proximal end of the boom; and the illumination controller is configured or programmed to, when the arm is within an intermediate range between a crowd range and a dump range, perform a fifth control to control an illuminance of the third light source such that the illuminance of the third light source is higher than at least one of the illuminance of the third light source when the arm is within the crowd range or the illuminance of the third light source when the arm is within the dump range, the crowd range being a portion of a swinging range of the arm that is located in the arm-crowd direction, the dump range being another portion of the swinging range that is located downstream of the crowd range in the arm-dump direction.

* * * * *